US008864971B2

(12) United States Patent
Jha et al.

(10) Patent No.: US 8,864,971 B2
(45) Date of Patent: Oct. 21, 2014

(54) WATER TREATMENT SYSTEM AND METHOD

(71) Applicant: Evoqua Water Technologies LLC, Alpharetta, GA (US)

(72) Inventors: Anil D. Jha, San Francisco, CA (US); Frederick C. Wilkins, Pepperell, MA (US); Evgeniya Freydina, Acton, MA (US); Aytac Sezgi, Bedford, NH (US); Reshma Madhusudan, Chicago, IL (US)

(73) Assignee: Evoqua Water Technologies LLC, Alpharetta, GA (US)

( * ) Notice: Subject to any disclaimer, the term of this patent is extended or adjusted under 35 U.S.C. 154(b) by 0 days.

(21) Appl. No.: 13/768,362

(22) Filed: Feb. 15, 2013

(65) Prior Publication Data

US 2013/0256135 A1   Oct. 3, 2013

Related U.S. Application Data

(63) Continuation of application No. 10/712,166, filed on Nov. 13, 2003, now Pat. No. 8,377,279.

(51) Int. Cl.
| | |
|---|---|
| *B01D 61/48* | (2006.01) |
| *C02F 5/00* | (2006.01) |
| *C02F 1/42* | (2006.01) |
| *C02F 1/469* | (2006.01) |
| *C02F 1/46* | (2006.01) |

(52) U.S. Cl.
CPC ............ C02F 5/00 (2013.01); *C02F 2201/4613* (2013.01); *C02F 1/42* (2013.01); *C02F 1/4695* (2013.01); *C02F 1/4602* (2013.01); C02F 1/469 (2013.01); *C02F 2201/4612* (2013.01); *C02F 2209/005* (2013.01); *C02F 2303/16* (2013.01); *C02F 2201/46115* (2013.01)

USPC ............ 204/523; 204/524; 204/525; 204/529

(58) Field of Classification Search
USPC .................................. 204/523, 524, 525, 529
See application file for complete search history.

(56) References Cited

U.S. PATENT DOCUMENTS

| | | | |
|---|---|---|---|
| 2,514,415 | A | 7/1950 | Rasch |
| 2,535,035 | A | 12/1950 | Briggs |

(Continued)

FOREIGN PATENT DOCUMENTS

| | | |
|---|---|---|
| AU | 629790 A | 10/1992 |
| CA | 2316012 A1 | 2/2001 |

(Continued)

OTHER PUBLICATIONS

ASTM, "Standard Practice for Calculation and Adjustment of the Langelier Saturation Index for Reverse Osmosis". Designation: D3739-94 (Reapproved 1998), pp. 1-4.

(Continued)

*Primary Examiner* — Arun S Phasge

(57) ABSTRACT

A treatment system provides treated or softened water to a point of use by removing at least a portion of any undesirable species contained in water from a water source. The treatment system can be operated to reduce the likelihood of formation of any scale that can be generated during normal operation of an electrochemical device. The formation of scale in the treatment system, including its wetted components, may be inhibited by reversing or substituting the flowing liquid having hardness-causing species with another liquid having a low tendency to produce scale, such as a low LSI water. Various arrangements of components in the treatment system can be flushed by directing the valves and the pumps of the system to displace liquid having hardness-causing species with a liquid that has little or no tendency to form scale.

20 Claims, 9 Drawing Sheets

(56) References Cited

U.S. PATENT DOCUMENTS

| | | |
|---|---|---|
| 2,681,319 A | 6/1954 | Bodamer |
| 2,681,320 A | 6/1954 | Bodamer |
| 2,689,826 A | 9/1954 | Kollsman |
| 2,777,814 A | 1/1957 | Latham |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,906,684 A | 9/1959 | Stoddard |
| 2,912,372 A | 11/1959 | Stoddard |
| 2,923,674 A | 2/1960 | Kressman |
| 2,943,989 A | 7/1960 | Kollsman |
| 3,014,855 A | 12/1961 | Kressman |
| 3,074,864 A | 1/1963 | Gaysowski |
| 3,091,583 A | 5/1963 | Schufle |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal |
| 3,165,460 A | 1/1965 | Zang |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |
| 3,645,884 A | 2/1972 | Gilliland |
| 3,679,055 A | 7/1972 | Clark et al. |
| 3,686,089 A | 8/1972 | Korngold |
| 3,755,135 A | 8/1973 | Johnson |
| 3,786,924 A | 1/1974 | Huffman |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,162,218 A | 7/1979 | McCormick |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,359,789 A | 11/1982 | Roberts |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,610,790 A | 9/1986 | Reti et al. |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,830,721 A | 5/1989 | Bianchi et al. |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,032,265 A | 7/1991 | Jha et al. |
| 5,059,330 A | 10/1991 | Burkhardt |
| 5,064,097 A | 11/1991 | Brog et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,107,896 A | 4/1992 | Otto |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,192,432 A | 3/1993 | Andelman |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| 5,240,579 A | 8/1993 | Kedem |
| 5,254,227 A | 10/1993 | Cawlfield et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,342,521 A | 8/1994 | Bardot et al. |
| 5,346,624 A | 9/1994 | Libutti et al. |
| 5,346,924 A | 9/1994 | Giuffrida |
| 5,352,364 A | 10/1994 | Kruger et al. |
| 5,356,849 A | 10/1994 | Matviya et al. |
| 5,358,640 A | 10/1994 | Zeiher et al. |
| 5,376,253 A | 12/1994 | Rychen et al. |
| 5,397,445 A | 3/1995 | Umemura et al. |
| 5,411,641 A | 5/1995 | Trainham, III et al. |
| 5,415,786 A | 5/1995 | Martin et al. |
| 5,423,965 A | 6/1995 | Kunz |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,538,746 A | 7/1996 | Levy |
| 5,539,002 A | 7/1996 | Watanabe |
| 5,547,551 A | 8/1996 | Bahar et al. |

(56) References Cited

U.S. PATENT DOCUMENTS

| | | | |
|---|---|---|---|
| 5,558,753 A * | 9/1996 | Gallagher et al. ............ 204/632 |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,868,937 A | 2/1999 | Back et al. |
| 5,891,328 A | 4/1999 | Goldstein |
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,017,433 A | 1/2000 | Mani |
| 6,056,878 A | 5/2000 | Tessier et al. |
| 6,099,716 A | 8/2000 | Molter et al. |
| 6,103,125 A | 8/2000 | Kuepper |
| 6,126,805 A | 10/2000 | Batchelder et al. |
| RE36,972 E | 11/2000 | Baker et al. |
| 6,146,524 A | 11/2000 | Story |
| 6,149,788 A | 11/2000 | Tessier et al. |
| 6,156,180 A | 12/2000 | Tessier et al. |
| 6,171,374 B1 | 1/2001 | Barton et al. |
| 6,187,154 B1 | 2/2001 | Yamaguchi et al. |
| 6,187,162 B1 | 2/2001 | Mir |
| 6,190,528 B1 | 2/2001 | Li et al. |
| 6,190,553 B1 | 2/2001 | Lee |
| 6,190,558 B1 | 2/2001 | Robbins |
| 6,193,869 B1 | 2/2001 | Towe et al. |
| 6,197,174 B1 | 3/2001 | Barber et al. |
| 6,197,189 B1 | 3/2001 | Schwartz et al. |
| 6,214,204 B1 | 4/2001 | Gadkaree et al. |
| 6,228,240 B1 | 5/2001 | Terada et al. |
| 6,235,166 B1 | 5/2001 | Towe et al. |
| 6,241,893 B1 | 6/2001 | Levy |
| 6,248,226 B1 | 6/2001 | Shinmei et al. |
| 6,254,741 B1 | 7/2001 | Stuart et al. |
| 6,258,265 B1 | 7/2001 | Jones |
| 6,258,278 B1 | 7/2001 | Tonelli et al. |
| 6,267,891 B1 | 7/2001 | Tonelli et al. |
| 6,274,019 B1 | 8/2001 | Kuwata |
| 6,279,019 B1 | 8/2001 | Oh et al. |
| 6,284,124 B1 | 9/2001 | DiMascio et al. |
| 6,284,399 B1 | 9/2001 | Oko et al. |
| 6,296,751 B1 | 10/2001 | Mir |
| 6,303,037 B1 | 10/2001 | Tamura et al. |
| 6,309,532 B1 | 10/2001 | Tran et al. |
| 6,312,577 B1 | 11/2001 | Ganzi et al. |
| 6,315,886 B1 | 11/2001 | Zappi et al. |
| 6,344,122 B1 | 2/2002 | Deguchi et al. |
| 6,365,023 B1 | 4/2002 | De Los Reyes et al. |
| 6,375,812 B1 | 4/2002 | Leonida |
| 6,391,178 B1 | 5/2002 | Garcia et al. |
| 6,398,965 B1 | 6/2002 | Arba et al. |
| 6,402,916 B1 | 6/2002 | Sampson et al. |
| 6,402,917 B1 | 6/2002 | Emery et al. |
| 6,428,689 B1 | 8/2002 | Kameyama et al. |
| 6,458,257 B1 | 10/2002 | Andrews et al. |
| 6,461,512 B1 | 10/2002 | Hirayama et al. |
| 6,482,304 B1 | 11/2002 | Emery et al. |
| 6,495,014 B1 | 12/2002 | Datta et al. |
| 6,514,398 B2 | 2/2003 | DiMascio et al. |
| 6,579,445 B2 | 6/2003 | Nachtman et al. |
| 6,607,647 B2 | 8/2003 | Wilkins et al. |
| 6,607,668 B2 | 8/2003 | Rela |
| 6,627,073 B2 | 9/2003 | Hirota et al. |
| 6,645,383 B1 | 11/2003 | Lee et al. |
| 6,648,307 B2 | 11/2003 | Nelson et al. |
| 6,649,037 B2 | 11/2003 | Liang et al. |
| 6,726,822 B2 | 4/2004 | Garcia et al. |
| 6,733,646 B2 | 5/2004 | Sato et al. |
| 6,766,812 B1 | 7/2004 | Gadini |
| 6,780,328 B1 | 8/2004 | Zhang |
| 6,783,666 B2 | 8/2004 | Takeda et al. |
| 6,808,608 B2 | 10/2004 | Srinivasan et al. |
| 6,824,662 B2 | 11/2004 | Liang et al. |
| 6,896,814 B2 | 5/2005 | Chidambaran et al. |
| 6,908,546 B2 | 6/2005 | Smith |
| 6,929,748 B2 | 8/2005 | Avijit et al. |
| 7,083,733 B2 | 8/2006 | Freydina et al. |
| 7,329,358 B2 | 2/2008 | Wilkins et al. |
| 7,563,351 B2 | 7/2009 | Wilkins et al. |
| 7,572,359 B2 | 8/2009 | Liang et al. |
| 7,582,198 B2 | 9/2009 | Wilkins et al. |
| 7,604,725 B2 | 10/2009 | Ganzi et al. |
| 7,846,340 B2 | 12/2010 | Freydina et al. |
| 7,862,700 B2 | 1/2011 | Wilkins et al. |
| 2001/0003329 A1 | 6/2001 | Sugaya et al. |
| 2002/0092769 A1 | 7/2002 | Garcia et al. |
| 2002/0103724 A1 | 8/2002 | Huxter |
| 2002/0144954 A1 | 10/2002 | Arba et al. |
| 2002/0189951 A1 | 12/2002 | Liang et al. |
| 2003/0034292 A1 | 2/2003 | Rela |
| 2003/0038089 A1 | 2/2003 | Levy |
| 2003/0080467 A1 | 5/2003 | Andrews et al. |
| 2003/0089609 A1 | 5/2003 | Liang et al. |
| 2003/0098266 A1 | 5/2003 | Shiue et al. |
| 2003/0106845 A1 | 6/2003 | Bernard et al. |
| 2003/0155243 A1 | 8/2003 | Sferrazza |
| 2003/0201235 A1 | 10/2003 | Chidambaran et al. |
| 2004/0035802 A1 | 2/2004 | Emery et al. |
| 2004/0060823 A1 | 4/2004 | Carson et al. |
| 2004/0079700 A1 | 4/2004 | Wood et al. |
| 2004/0089551 A1 | 5/2004 | Liang et al. |
| 2004/0118780 A1 | 6/2004 | Willman et al. |
| 2005/0016932 A1 | 1/2005 | Arba et al. |
| 2005/0103622 A1 | 5/2005 | Jha et al. |
| 2005/0103630 A1 | 5/2005 | Ganzi et al. |
| 2005/0103631 A1 | 5/2005 | Freydina et al. |
| 2005/0103644 A1 | 5/2005 | Wilkins et al. |
| 2005/0103717 A1 | 5/2005 | Jha et al. |
| 2005/0103722 A1 | 5/2005 | Freydina et al. |
| 2005/0103723 A1 | 5/2005 | Wilkins et al. |
| 2005/0109703 A1 | 5/2005 | Newenhizen |
| 2005/0263457 A1 | 12/2005 | Wilkins et al. |
| 2006/0060532 A1 | 3/2006 | Davis |
| 2006/0231403 A1 | 10/2006 | Riviello |

FOREIGN PATENT DOCUMENTS

| | | |
|---|---|---|
| CN | 1044411 A | 8/1990 |
| DE | 1201055 B | 9/1965 |
| DE | 3238280 A1 | 4/1984 |
| DE | 4016000 A1 | 11/1991 |
| DE | 4418812 A1 | 12/1995 |
| DE | 19942347 A1 | 3/2001 |
| EP | 0170895 A2 | 2/1986 |
| EP | 0503589 A1 | 9/1992 |
| EP | 0417506 B1 | 3/1993 |
| EP | 0621072 A2 | 10/1994 |
| EP | 0680932 A2 | 11/1995 |
| EP | 0803474 A2 | 10/1997 |
| EP | 0870533 A1 | 10/1998 |
| EP | 1068901 A2 | 1/2001 |
| EP | 1075868 A2 | 2/2001 |
| EP | 1101790 A1 | 5/2001 |
| EP | 1106241 A1 | 6/2001 |
| EP | 1129765 A1 | 9/2001 |
| EP | 1172145 A2 | 1/2002 |
| EP | 1222954 A1 | 7/2002 |

(56) References Cited

FOREIGN PATENT DOCUMENTS

| | | |
|---|---|---|
| EP | 1506941 A1 | 2/2005 |
| GB | 776469 A | 6/1957 |
| GB | 877239 A | 9/1961 |
| GB | 880344 A | 10/1961 |
| GB | 893051 A | 4/1962 |
| GB | 942762 A | 11/1963 |
| GB | 1048026 A | 11/1966 |
| GB | 1137679 A | 12/1968 |
| GB | 1318036 A | 5/1973 |
| GB | 1381681 A | 1/1975 |
| GB | 1448533 A | 9/1976 |
| GB | 2278069 B | 7/1997 |
| GB | 2303802 B | 12/1997 |
| JP | 52-047580 A | 4/1977 |
| JP | 54-005888 | 1/1979 |
| JP | 63-036893 A | 2/1988 |
| JP | 03-207487 A | 9/1991 |
| JP | 07-155750 A | 6/1995 |
| JP | 07-265865 A | 10/1995 |
| JP | 09-253643 A | 9/1997 |
| JP | H10500617 A | 1/1998 |
| JP | 11042483 A | 2/1999 |
| JP | 2001079358 A | 3/2001 |
| JP | 2001079553 A | 3/2001 |
| JP | 2001-104960 A | 4/2001 |
| JP | 2001-113137 A | 4/2001 |
| JP | 2001-113279 A | 4/2001 |
| JP | 2001-113280 A | 4/2001 |
| JP | 2001-121152 A | 5/2001 |
| JP | 2003094064 A | 4/2003 |
| JP | 2005007347 A | 1/2005 |
| JP | 2005007348 A | 1/2005 |
| JP | 5-134094 | 1/2013 |
| RO | 114874 B1 | 8/1999 |
| WO | 9211089 A1 | 7/1992 |
| WO | 9532052 A1 | 11/1995 |
| WO | 9532791 A1 | 12/1995 |
| WO | 9622162 A1 | 7/1996 |
| WO | 9725147 A1 | 7/1997 |
| WO | 9746491 A1 | 12/1997 |
| WO | 9746492 A1 | 12/1997 |
| WO | 9811987 A1 | 3/1998 |
| WO | 9817590 A1 | 4/1998 |
| WO | 9820972 A1 | 5/1998 |
| WO | 9858727 A1 | 12/1998 |
| WO | 9939810 A1 | 8/1999 |
| WO | 0030749 A1 | 6/2000 |
| WO | 0064325 A2 | 11/2000 |
| WO | 0075082 A1 | 12/2000 |
| WO | 0130229 A1 | 5/2001 |
| WO | 0149397 A1 | 7/2001 |
| WO | 0204357 A1 | 1/2002 |
| WO | 0214224 A1 | 2/2002 |
| WO | 0226629 A2 | 4/2002 |
| WO | 02096807 A2 | 12/2002 |
| WO | 03033122 A2 | 4/2003 |
| WO | 03072229 A1 | 9/2003 |
| WO | 03086590 A1 | 10/2003 |
| WO | 2004106243 A1 | 12/2004 |

OTHER PUBLICATIONS

Buros "The ABCs of Desalting". Second Edition, published by the International Desalination Association, Topsfield, MA U.S.A. 2000.

Calay et al. "The Use of EDI to Reduce the Ammonia Concentration in Steam Generators Blowdown of PWR Nuclear Power Plants". PowerPlant Chemistry, vol. 2, No. 8. (2000). pp. 467-470.

Cowan et al. "Effect of Turbulence on Limiting Current in Electrodialysis Cells". Industrial and Engineering Chemistry, vol. 51, No. 12 pp. 1445-1448. Dec. 1959.

Dimascio et al. "Continuous Electrodeionization: Production of High-Purity Water without Regeneration Chemicals". The Electrochemical Society Interface, Fall 1998. pp. 26-29.

Dimascio et al. Electrodiaresis Polishing (An Electrochemical Deionization Process) 1994, pp. 164-172.

Dow Chemical "Dowex Marathon A Ion Exchange Resin". Published Dec. 1999, Product Literature reprinted from www.dow.com.

Dow Chemical "Dowex Marathon A2 Ion Exchange Resin". Published Dec. 1999, Product Literature reprinted from www.dow.com.

Dupont Nafion PFSA Products, Technical Information, "Safe Handling and Use and Perfluorosulfonic Acid Products". Nov. 1993, 4 pgs.

Farmer et al. "Capacitive Deionization of NH4CIO4 Solutions with Carbon Aerogel Electrodes". J. Appl. Electro-Chemistry, vol. 26 (1996), pp. 1006-1018.

Farmer et al. "Capacitive Deionization of NH4CIO4 Solutions with Carbon Aerogel Electrodes". Journal of Applied Electrochemistry, 26:1007 (1996).

FDA "Guide to Inspections of High Purity Water Systems". Jul. 1993, printed from www.fda.gov on Mar. 30, 2004.

Ganzi et al. "Electrodeionization: Theory and Practice of Continuous Electrodeionization". Ultrapure Water, Jul./Aug. 1997. pp. 64-69.

Gittens et al. "The Application of Electrodialysis to Demineralisation". A.I. Ch.E-I.Chem.E. Symposium Series No. 9. (1967) London: Inst. Chem..Engrs) pp. 79-83.

Glueckauf "Electro-Deionisation Through a Packed Bed". British Chemical Engineering, Dec. 1959 pp. 646-651.

Hobro et al. "Recycling of Chromium from Metal Finishing Waste Waters Using Electrochemical Ion Exchange (EIX)". Proceedings of the Electrochemical Society vol. 94-19 pp. 173-183.

Jha et al. "CEDI: Selecting the Appropriate Configuration". Power Engineering Aug. 2000 edition.

Johnson et al. "Desalting by Means of Porous Carbon Electrodes". Electrochemical Technology vol. 118 No. 3 (Mar. 1971) pp. 510-517.

Kedem et al. "EDS—Sealed Cell Electrodialysis". Desalination vol. 46 (1983) pp. 291-298.

Kedem et al. "Reduction of Polarization by Ion-Conduction Spacers: Theoretical Evaluation of a Model System". Desalination vol. 27 (1978) pp. 143-156.

Korngold "Electrodialysis Process Using Ion Exchange Resins Between Membranes". Desalination vol. 16. (1975) pp. 225-233.

Matejka "Continuous Production of High-Purity Water by Electro-Deionisation". J. Appl. Chem. Biotechnol. vol. 21 (Apr. 1971) pp. 117-120.

Oren et al. "Studies on Polarity Reversal with Continuous Deionization". Desalination vol. 86 No. 2. Jun. 1, 1992. pp. 155-171.

Pourcelly. "Conductivity and Selectivity of Ion Exchange Membranes: Structure-Correlations". Desalination vol. 147 (2002) pp. 359-361.

Purolite Technical Bulliten, Hypersol-Macronet™ Sorbent Resins (1995).

Shaposhnik et al. "Demineralization of Water by Electrodialysis with Ion-Exchange Membrane, Grains and Nets". Desalination vol. 133 (2001). pp. 211-214.

Simons "Electric Field Effects on Proton Transfer Between Ionizable Groups and Water in Ion Exchange Membranes". Electrochemica Acta vol. 29 No. 2 (1984) pp. 155-158.

Simons "Strong Electric Field Effects on Proton Transfer Between Membrane-Bound Amines and Water". Nature vol. 280. Aug. 30, 1979 pp. 824-826.

Simons The Origin and Elimination of Water Splitting in Ion Exchange Membranes During Water Demineralisation by Electrodialysis. Desalination vol. 28. Jan. 29, 1979. pp. 41-42.

Simons "Water Splitting in Ion Exchange Membranes". Pergamon Press Ltd. (1985) pp. 275-282.

US Filter "H-Series Industrial CDI® Systems". Product Information (1998). 4 Pages.

Walters et al. "Concentration of Radioactive Aqueous Wastes". Industrial and Engineering Chemistry, Jan. 1955, pp. 61-67.

Warshawsky et al. "Thermally Regenerable Polymerable Polymeric Crown Ethers, II Synthesis and Application in Electrodialysis". pp. 579-584. publication and date unknown.

* cited by examiner

WATER TREATMENT SYSTEM AND METHOD

CROSS-REFERENCE TO RELATED APPLICATIONS

This application is a continuation application of U.S. patent application Ser. No. 10/712,166 filed on Nov. 13, 2003 (now U.S. Pat. No. 8,377,279) which is hereby incorporated herein by reference in its entirety for all purposes.

BACKGROUND OF THE INVENTION

1. Field of the Invention

The present invention relates, generally, to a system and method of purifying or treating a fluid and, more particularly, to a water treatment system incorporating an electrochemical device and a reservoir for delivering treated water to a point of use and a method of operating and flushing the water treatment system.

2. Description of Related Art

Water that contains hardness species such as calcium and magnesium may be undesirable for some uses in industrial, commercial and household applications. The typical guidelines for a classification of water hardness are: zero to 60 milligrams per liter (mg/l) as calcium carbonate is classified as soft; 61 to 120 mg/l as moderately hard; 121 to 180 mg/l as hard; and more than 180 mg/l as very hard.

Hard water can be softened or treated by removing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Other systems have been disclosed. For example, Dosch, in U.S. Pat. No. 3,148,687 teaches a washing machine including a water softening arrangement using ion exchange resins. Similarly, Gadini et al., in International Application Publication No. WO00/64325, disclose a household appliance using water with an improved device for reducing the water hardness. Gadini et al. teach of a household appliance having a control system, a water supply system from an external source and a softening system with an electrochemical cell. McMahon, in U.S. Pat. No. 5,166,220, teaches of a regeneration of ion exchange resin with a brine solution in a water softening process.

Electrodeionization (EDI) can be used to soften water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charge and can be operated to cause electrochemical reactions designed to achieve or enhance performance. These devices also include electrically active membranes such as semi-permeable ion exchange or bipolar membranes.

Continuous electrodeionization (CEDI) is a process that relies on ion transport through electrically active media (electroactive media). A typical CEDI device includes alternating electroactive semi-permeable anion and cation selective membranes. The spaces between the membranes are configured to create liquid flow compartments with inlets and outlets. A transverse DC electrical field is imposed by an external power source through electrodes at the bounds of the compartments. In some configurations, electrode compartments are provided so that reaction product from the electrodes can be separated from the other flow compartments. Upon imposition of the electric field, ions in the liquid to be treated in one compartment, the ion-depleting compartments, are attracted to their respective attracting electrodes. The ions migrate through the selectively permeable membranes into the adjoining compartments so that the liquid in the adjoining ion-concentrating compartments become ionically concentrated. The volume within the depleting compartments and, in some embodiments, within the concentrating compartments, includes electrically active or electroactive media. In CEDI devices, the electroactive media may include intimately mixed anion and cation exchange resins. Such electroactive media typically enhances the transport of ions within the compartments and may participate as a substrate for controlled electrochemical reactions. Electrodeionization devices have been described by, for example, Giuffrida et al. in U.S. Pat. Nos. 4,632,745, 4,925,541 and 5,211,823, by Ganzi in U.S. Pat. Nos. 5,259,936 and 5,316,637, by Oren et al. in U.S. Pat. No. 5,154,809 and by Kedem in U.S. Pat. No. 5,240,579.

Other systems that can be used to demineralize water have been described. For example, Gaysowski, in U.S. Pat. No. 3,407,864, teaches of an apparatus that involves both ion exchange and electrodialysis. Johnson, in U.S. Pat. No. 3,755,135, teaches of a demineralizing apparatus using a DC potential.

SUMMARY OF THE INVENTION

The present invention is directed to a treatment system. The treatment system can comprise an electrochemical device comprising a first compartment and a second compartment, a first liquid circuit fluidly a first compartment inlet and a first pump, a second liquid circuit fluidly connecting a second compartment outlet to a second compartment inlet and a second pump and a third liquid circuit fluidly connecting the second compartment inlet and the second pump.

In accordance with one or more embodiments, the present invention provides a treatment system. The treatment system can comprise an electrochemical device comprising a first compartment comprising a first compartment outlet and a first compartment inlet and a second compartment comprising a second compartment outlet and a second compartment inlet, a first pump fluidly connectable to the first compartment outlet and to the first compartment inlet, a second pump fluidly connectable to the second compartment outlet and to the second compartment inlet, and a circulation line fluidly connectable to at least one of the first or second compartment outlets. The electrochemical device fluidly is typically connected to a point of entry In accordance with one or more embodiments, the present invention provides a method of treating a liquid. The method can comprise establishing a first liquid circuit having liquid to be treated flowing therein from a reservoir to a first compartment inlet of an electrochemical device through a first pump, establishing a second liquid circuit having a concentrating liquid flowing therein from a second compartment outlet of the electrochemical device to a second compartment inlet through a second pump, and establishing a third liquid circuit having liquid to be treated flowing therein from the reservoir to the second compartment inlet through the second pump.

In accordance with one or more embodiments, the present provides a method of treating water. The method can comprise passing at least a portion of water to be treated through a depleting compartment of an electrochemical device through a first pump to produce the treated water, circulating the concentrated stream through a concentrating compartment of the electrochemical device through a second pump, and circulating the concentration stream through the concentrating compartment through the first pump.

In accordance with one or more embodiments, the present invention provides a method of treating water. The method can comprise passing water to be treated through an electrochemical device to produce treated water, storing at least a portion of the treated water in a water reservoir, and flushing a concentrating compartment of the electrochemical device with the treated water.

In accordance with one or more embodiments, the present invention provides the method of facilitating water purification. The method can comprise providing an to electrochemical device comprising a first compartment and a second compartment; providing a first pump fluidly connectable to at least one of a water reservoir, a first compartment outlet and a first compartment inlet; providing a second pump fluidly connectable to at least one of the water reservoir, a second compartment outlet and a second compartment inlet; and providing a circulation line fluidly connectable to at least one of the first and second compartment outlets.

In accordance with one or more embodiments, the present invention provides a treatment system. The treatment system can comprise an electrochemical device comprising a first compartment and a second compartment, means for flowing a liquid to be treated from a water reservoir through the first compartment and circulating a concentrating liquid through the second compartment and means for flowing the liquid to be treated from the water reservoir through the second compartment and circulating the concentrating liquid through the first compartment.

Other advantages, novel features and objects of the invention will become apparent from the following detailed description of the invention when considered in conjunction with the accompanying drawings, which are schematic and are not intended to be drawn to scale. In the figures, each identical or substantially similar component that is illustrated in various figures is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Preferred, non-limiting embodiments of the present invention will be described by way of example and with reference to the accompanying drawings, in which.

DETAILED DESCRIPTION OF THE INVENTION

United States patent applications titled WATER TREATMENT SYSTEM AND METHOD by Wilkins et al. and filed on even date herewith; WATER TREATMENT SYSTEM AND METHOD by Jha et al. and filed on even date herewith; WATER TREATMENT SYSTEM AND METHOD by Ganzi et al. and filed on even date herewith; WATER TREATMENT SYSTEM AND METHOD by Freydina et al. and filed on even date herewith; WATER TREATMENT SYSTEM AND METHOD by Wilkins et al. and filed on even date herewith; WATER TREATMENT SYSTEM AND METHOD by Freydina et al. and filed on even date herewith; and WATER TREATMENT SYSTEM AND METHOD by Wilkins et al. and filed on even date herewith are hereby incorporated by reference herein.

The present invention is directed to a purification or treatment system and method of providing treated water in industrial, commercial and residential applications. The treatment system provides treated water or, in some cases, softened water, to a point of use by removing at least a portion of any undesirable species such as hardness-causing species to contained in water from a water source, such as municipal water, well water, brackish water and other water sources. The treatment system can be operated to reduce the likelihood of formation of any scale or foulants that are typically generated while producing treated water. The formation of scale or foulants in the treatment system, including its components, such as any pumps, valves and lines, may be inhibited by reversing or substituting the flowing liquid from one having a high tendency to form scale to a liquid having a low no tendency to produce scale, such as a water having a low Langelier Saturation Index (LSI). LSI can be calculated according to, for example, ASTM D 3739.

The treatment system typically receives water from the water source or a point of entry and purifies the water that may contain undesirable species. The treatment system also provides or delivers the treated water to a point of use, typically through a water distribution system. The treatment system typically has a reservoir system in line with an electrochemical device such as an electrodeionization device. The treatment system, in some embodiments, also comprises a sensor for measuring at least one property of the water or an operating condition of the system. In accordance with other embodiments of the present invention, the treatment system also includes a controller for adjusting or regulating at least one operating parameter of the treatment system or a component of the treatment system such as, but not limited to, actuating valves, energizing pumps or other components of the system.

Figure 1:
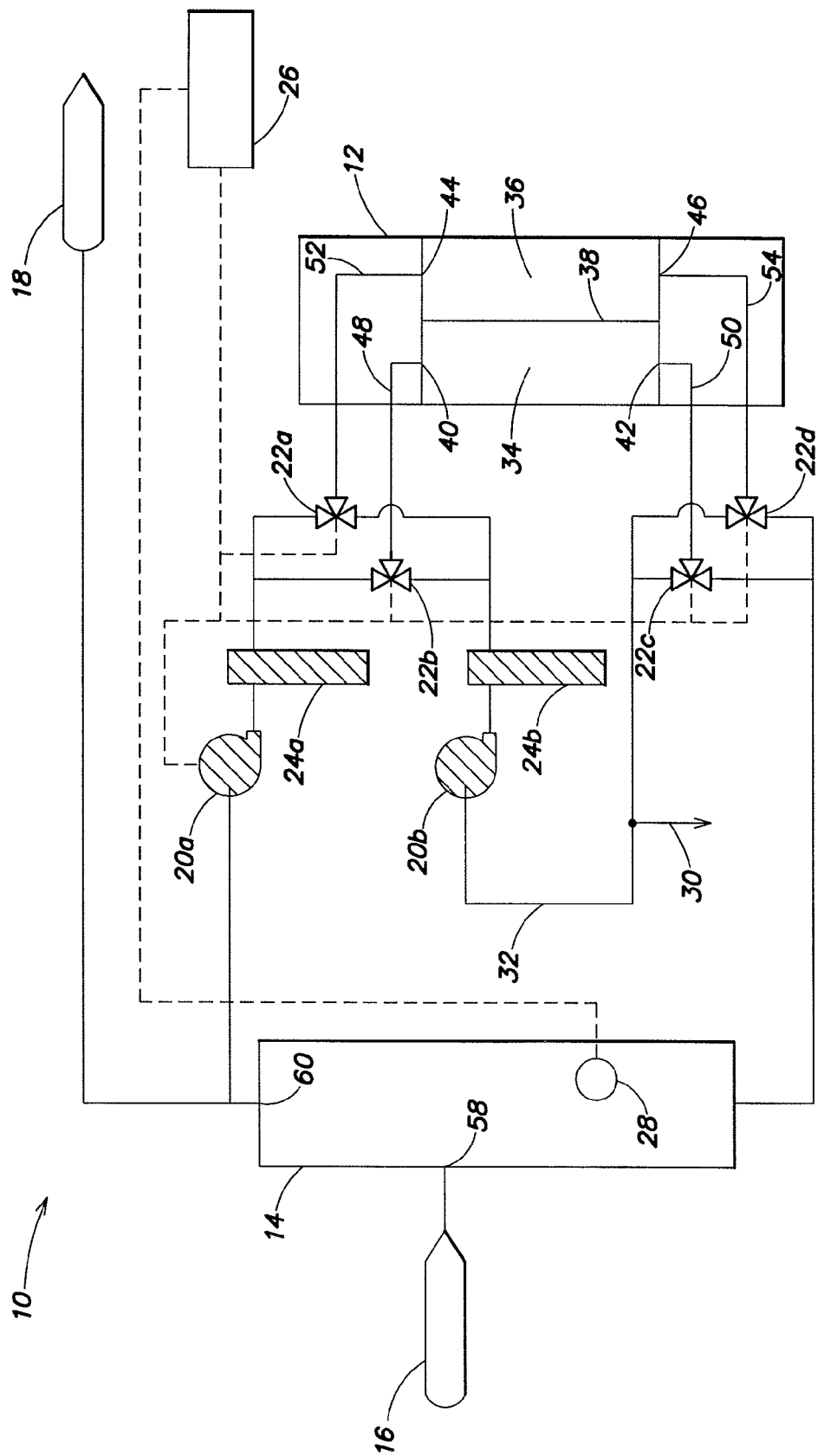
FIG. 1 is a schematic flow diagram of a treatment system showing a reservoir in line with an electrochemical device in accordance with one or more embodiments of the invention.

FIG. 1 is a schematic flow diagram of a treatment system according to one embodiment of the present invention. The treatment system 10 can include an electrodeionization device 12 fluidly connected to a reservoir system 14, which is typically fluidly connected to a water source or a point of entry 16. Treatment system 10 typically includes a point of use 18, which is typically fluidly connected to reservoir system 14. According to one embodiment of the present invention, treatment system 10 includes pumps 20a and 20b, which can be used to pump liquid from reservoir system 14 and, in some cases, circulate a liquid from an outlet to an inlet of electrodeionization device 12 through a circulation line 32. In certain embodiments of the invention, treatment system 10 includes valves 22a, 22b, 22c and 22d that can be used to direct flow to and from electrodeionization device 12 and to and from reservoir system 14, as well as through pumps 20a, 20b and a pretreatment filter 24a and 24b. In the figures, not all the valves have been illustrated for purposes of clarity; for example, a valve controlling flow of a stream to drain 30 is not shown. In another embodiment of the invention, treatment system 10 can include a control system, which typically includes a controller 26, as well as a sensor 28. Sensor 28 typically measures an operating parameter or a property of any the flowing fluids in treatment system 10. Typically, sensor 28 sends or transmits the measured parameter to control system 26.

In yet another embodiment of the present invention, control system 26 can actuate any valve to direct the flow of liquid in the water purification. In some cases, control system 26 can energize the motors of the pumps in the treatment system. Thus, control system 26 can monitor and control the operation of the treatment system.

Electrodeionization module or device 12 typically includes ion-depleting (depleting) compartments and ion-concentrating (concentrating) compartments. Adjacent compartments typically have an ion-selected membrane positioned therebetween. The assembly of concentrating and depleting compartments, typically known as the stack, may be in alternating order or in any of various arrangements necessary to satisfy design and performance requirements. The stack arrangement is typically bordered by an electrode compartment at one end and another electrode compartment at an opposite end. Typically, end blocks are positioned adjacent to end plates housing an anode and a cathode in respective electrode compartments. The concentrating and depleting compartments are typically defined by spacers or structures that offset and supportion selective membranes or selectively permeable membranes. The spacer, along with the selective membrane bonded thereon, define a cavity which may serve as a concentrating or a depleting compartment, depending on operating conditions as explained below.

The concentrating and depleting compartments can be filled with cation exchange resins anion exchange resins or a mixture of both. The cation and anion exchange resins can be arranged as mixtures or as layers within any of the depleting, concentrating and electrode compartments so that a number of layers in a variety of arrangements can be assembled. The use of mixed bed ion exchange resins in any of the depleting, concentrating and electrode compartments the use of inert resin between layers of beds of anionic and cationic exchange resins, as well as the use of various types of anionic and cationic exchange resins, such as those described by DiMascio et al., in U.S. Pat. No. 5,858,191, which is incorporated herein by reference in its entirety, is believed to be within the scope of the invention.

In operation, a liquid to be treated, typically from an upstream water source entering the treatment system 10 at point of entry 16, having dissolved cationic and anionic species, including hardness ion species, can be introduced into reservoir system 14. Liquid to be to treated may then be treated or demineralized in electrodeionization device 12 as described below. The produced treated liquid can then be transferred and stored in reservoir system 14. Treated liquid in reservoir system 14, or at least a portion thereof, can be transferred to point of use 18 through a connected, in one embodiment, water distribution system (not shown).

Liquid to be treated typically enters electrodeionization device or stack 12, preferably in a depleting compartment of electrodeionization device 12. An electric field can be applied across the stack through the electrodes. The applied electric field typically creates a potential that attracts cationic and anionic species to their respective electrodes. In this way, the cationic and anionic species tend to migrate toward their respective attracting electrodes from the depleting compartment to adjacent compartments, which, in some embodiments, are concentrating compartments. Selectively permeable membranes between compartments serve as barriers preventing further migration of ionic species into the next compartment. Thus, the ionic species from a liquid flowing in a depleting compartment can be trapped in an adjacent or nearby concentrating compartment thereby creating a treated liquid exiting the former compartment and a concentrate stream exiting the latter compartment. Representative suitable ion-selective membranes include, for example, web supported using styrene-divinyl benzene with sulphonic acid or quaternary ammonium functional groups, web supported using styrene-divinyl benzene in a polyvinylidene fluoride binder, and unsupported-sulfonated styrene and quarternized vinyl benzyl amine grafts on polyethylene sheet.

In some embodiments of the present invention, the applied electric field can create a polarization phenomenon, which typically leads to the dissociation of water, especially when water is used as liquid to be treated, into hydroxyl and hydrogen ions. The hydroxyl and hydrogen ions can regenerate the ion exchange resins in the depleting and concentrating compartments so that removal of the dissolved ionic species can occur under substantially ionically neutral conditions and can be performed continuously and without a separate step for regeneration of exhausted ion exchange resins.

The electric field is typically a direct current applied through the electrodes deionization device 12. However, any applied electric current that can create a bias or a potential difference between one electrode and another can be used to promote the migration of ionic species. Therefore, an alternating current may be used, provided that there is a potential difference between electrodes that is sufficient to attract cationic and anionic species to their respective attracting electrodes. For example, in one embodiment of the invention, an alternating current may be rectified, such as with a diode or a bridge rectifier to convert the alternating current to a pulsating current having sufficient potential to attract charged ionic species.

The electroactive media, typically cationic and anionic exchange resins, typically utilized in the depleting compartment and, in some cases, in the concentrating compartment, can have a variety of functional groups on their surface regions, including, but not limited to, tertiary alkyl amino groups and dimethyl ethanolamine. These can also be used in combination with other ion exchange resin materials having various functional groups such as, but not limited to quaternary ammonium groups. Other modifications and equivalents should occur to persons skilled in the art using no more than routine experimentation. For example, the use of layered beds of ion exchange resin within any of the depleting, concentrating, and electronic compartments may be used in the present invention.

Reservoir system 14 can serve to store or accumulate liquid from point of entry 16 and can also serve to store treated liquid from electrodeionization device 12. Reservoir system 14 can also provide treated water or at least partially treated water, to point of use 18. In some embodiments, reservoir system 14 comprises a vessel, such as a pressurized vessel that has inlets and outlets for fluid flow. As used herein, pressurized refers to any unit operation that has a differential pressure that is greater than about 2 psi. Accordingly, a pressurized vessel is a vessel that has a differential pressure, for example, through its wall, that is greater than about 2 psi.

In accordance with another embodiment of the present invention, reservoir system 14 comprises a plurality of vessels or reservoirs, each vessel, in turn can have several inlets positioned at various locations on each vessel. Each vessel may have one or several outlets, which can be positioned at various locations depending on, among other things, demand or flow rate to point of use 18, capacity or efficiency of electrodeionization device 12 as well as capacity or hold up of the reservoir system. Reservoir system 14 can further comprise various components or elements that perform desirable functions or avoid undesirable consequences. For example, reservoir system 12 can have vessels having internal components, such as baffles that are positioned to minimize any internal flow currents. In some cases, reservoir system 14 can have auxiliary or external components, including, but not limited to, pressure release valves designed to relieve undesirable internal pressure and avoid or at least reduce the likelihood of rupture and expansion systems that can to accommodate volumetric changes associated with temperature changes, for example, a thermal expansion tank, that is designed for maintaining a desired operating pressure. The size and capacity of such a thermal expansion tank will depend on several factors including, but not limited to, the total volume of water, the operating temperature and pressure of the reservoir system.

In accordance with another embodiment of the present invention, treatment system 10 can include a circulation line that fluidly connects at least one outlet of electrodeionization device 12. For example, circulation line 32 may connect to a manifold outlet (not shown), which collects liquid exiting a compartments, typically similar service compartments, in particular, depleting or concentrating compartments. Circulation line 32 can also be connected to an inlet of electrodeionization device 12 through, as illustrated in FIG. 1, pump 20b and valves 22a and 22b.

Electrodeionization device 12 can also comprise one or more electrodeionization stages, as described by Ganzi et al., in U.S. Pat. No. 5,316,637, which is incorporated herein by reference in its entirety. In each stage, a stack of depleting and concentrating compartments is positioned between first and second electrodes. According to one embodiment of the invention, each stage of electrodeionization device 12 includes a plurality compartments, each compartment defined, in part, by exterior membranes at either end thereof. A membrane of at least one compartment can co-extensively contact a membrane of an adjacent compartment; and according to one embodiment, all the compartment in the stack can be arranged adjacent each other with membranes of adjacent compartment in co-extensive contact with each other. Such an arrangement is described by Gallagher et al., in U.S. Pat. No. 5,736,023, which is incorporated herein by reference in its entirety.

As illustrated in the embodiment of FIG. 1, electrodeionization device 12 typically includes a first compartment 34 and an adjacent compartment 36, the first and second compartment separated by an ion selective membrane 38 positioned therebetween. According to one embodiment of the invention, first compartment 34 can serve as a depleting compartment and second compartment 36 can serve as a concentrating compartment. Notably, electrodeionization device 12 is schematically illustrated with a single depleting compartment and a single concentrating compartment; it is shown as such for illustration only. Thus, according to one preferred embodiment of the invention, a plurality of depleting compartment and a single concentrating compartments, defining a to stage, would be arranged between electrodes of the electrodeionization device.

First compartment 34 can include a first port 40 and a second port 42. Similarly, second compartment 36 can include a first port 44 and a second port 46. In accordance with one embodiment of the present invention, first port 40 and second port 42 can be positioned at opposite ends of first compartment 34 and first port 44 and second port 46 can be positioned at opposite ends of second compartment 36. First ports 40 and 44 may serve as liquid entrances into their respective compartments. Correspondingly, second ports 42 and 46 may serve as liquid exits of their respective compartments.

In accordance with another embodiment of the present invention, electrodeionization device 12 can comprise a plurality of first and second compartments. Each of the first compartments can comprise a first port and a second port. The plurality of first ports can be commonly fluidly connected to a first port manifold 48 and the plurality of second ports can be commonly fluidly connected to a second port manifold 50. Similarly, each of the second compartments can comprise a first port and a second port. The plurality of second compartment first ports can be commonly fluidly connected to a first port manifold 52 and the plurality of second compartment second ports can be commonly fluidly connected to a second port manifold 54.

First compartment 34 and second compartment 36 can be connected to a liquid circuit network having a plurality of fluid pathways or circuits defined by conduits, manifolds and valves. In one embodiment of the invention, shown in FIG. 1, a first liquid circuit can comprise fluid connections from reservoir system 14 to either of first compartment 34 or second compartment 36, through pump 20a, filter 24a, valves 22a and 22b and manifolds 48 and 52. The first fluid circuit can further comprise fluid connections from first compartment 34 and second compartment 36 to reservoir system 14, through manifolds 50 and 54 and valves 22c and 22d. In another embodiment of the invention, treatment system 10 can comprise a second liquid circuit through first compartment 34 or second compartment 36 and circulation line 32. In some cases, the second fluid circuit fluidly can connect circulation line 32 to first compartment 34 or second compartment 36 through pump 20b, filter 24b and any of valves 22a or 22b. The second fluid circuit can further comprise fluid connections through manifolds 48 and 52. Moreover, the second liquid circuit can further comprise fluid connections through manifold 50 or manifold 54 to any of valves 22c and 22d.

As used herein, the term liquid circuit is intended to define a particular connection and arrangement of valves and lines that allows a liquid stream to flow therein.

Other embodiments of the present invention will be described with reference to FIGS. 2A-2D. In the figures, darkened, bold lines represent pathways through which liquid can flow according to the described liquid circuit. For purposes of illustration, the various embodiments of the present invention will be described in terms of water purification. However, it is to be understood that the treatment of any liquid treatable by electrodeionization techniques can benefit for employment of the systems and methods of the present invention.

Figure 2A:
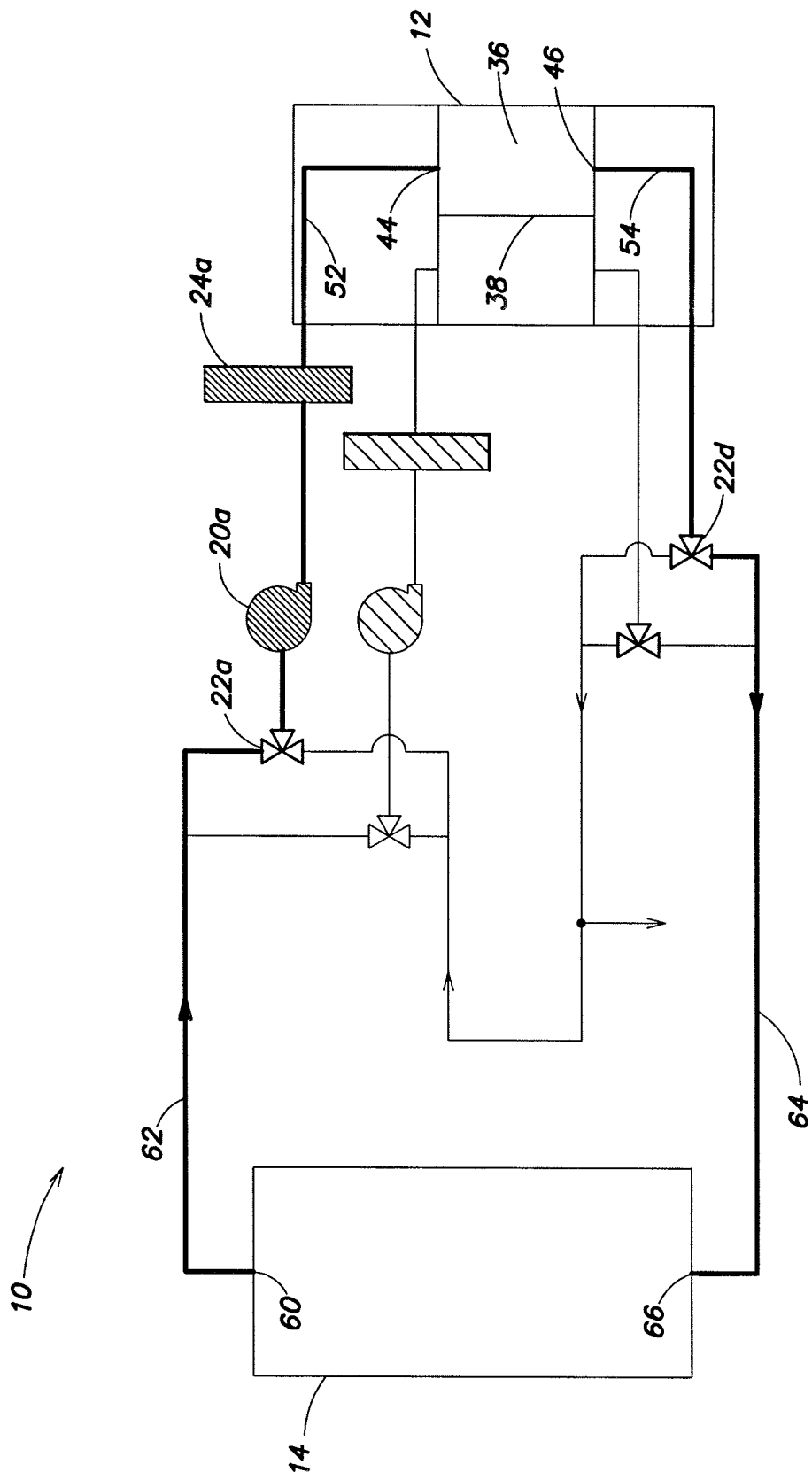
FIG. 2A is a schematic flow diagram for treatment system illustrating a first liquid circuit flowing therein in accordance with one or more embodiments of the invention.
Figure 2B:
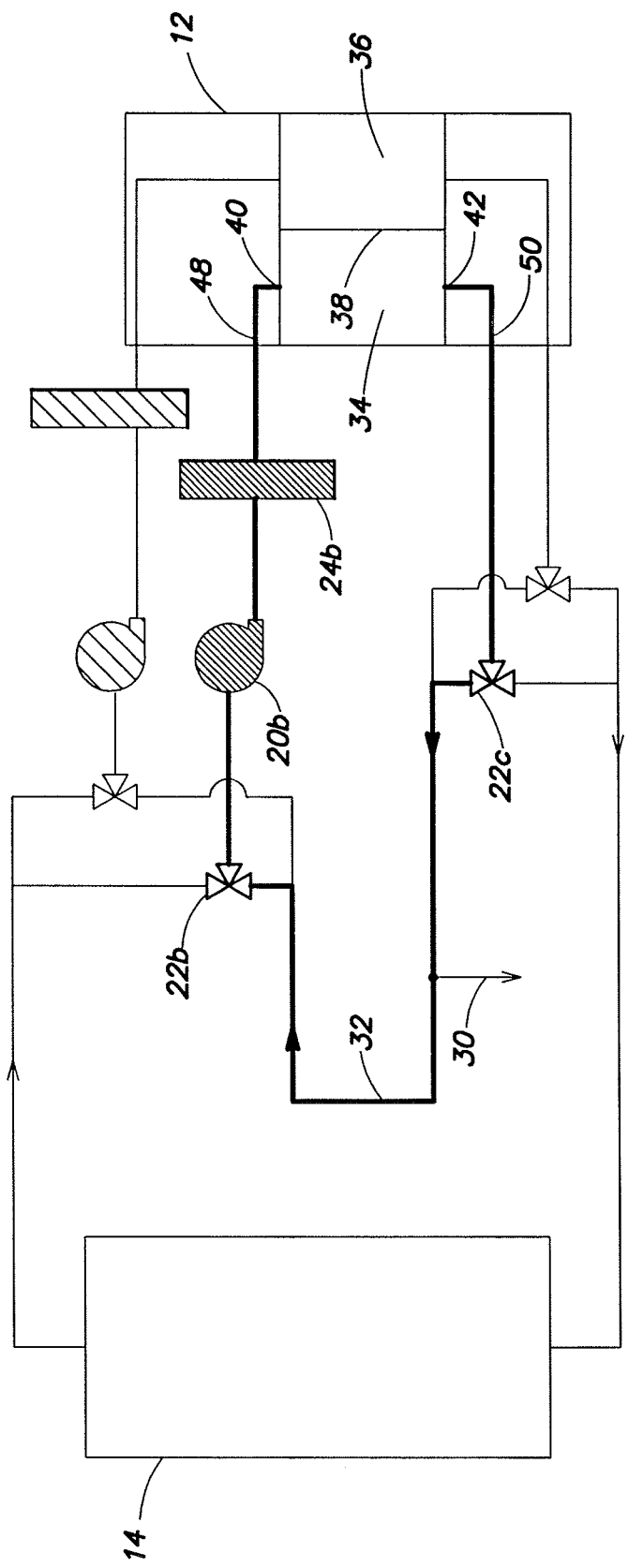
FIG. 2B is a schematic flow diagram of a treatment system illustrating a second fluid circuit flowing therein in accordance with one or more embodiments of the invention.

In FIG. 2A, a first liquid circuit is illustrated in which feed liquid, for example tap water, brackish water or pre-treated semi-pure water can enter treatment system 10 through a point of entry (not shown). Accordingly, in one embodiment of the invention, liquid to be treated can flow in a first liquid circuit from an outlet 60 of reservoir system 14 through conduit 62, valve 22a, pump 20a, optionally through filter 24a and manifold 52 into compartment 36 through port 44. The first liquid circuit can further comprise connections to compartment 36 through port 46 to manifold 54, valve 22d, conduit 64 and to reservoir system 14 through inlet 66. Valves 22a and 22d can be actuated to allow flow through the above described first liquid circuit. Thus, the first liquid circuit can provide liquid to be treated from reservoir system 14 to electrodeionization device 12 and can transfer the treated liquid and store it in reservoir system 14.

The present invention provides a second liquid circuit in treatment system 10. According to one embodiment of the invention, the second liquid circuit can allow a concentrating stream to flow in a closed loop through one compartment of electrodeionization device 12. As illustrated in the schematic diagram of FIG. 2B, the second liquid circuit can comprise a connection to and from circulation line 32 and to and from compartment 34 through valve 22b, pump 20b, optionally through filter 24b, into manifold 48 and can enter compartment 34 through port 40. The second liquid circuit can allow a liquid to exit compartment 34 through port 42 and manifold 50 and return to compartment 34 through circulation line 32 and manifold 48. According to one embodiment of the invention, the concentrating stream flowing in the second liquid circuit can comprise ionic species, which have migrated from compartment 36 through ion selective membrane 38 into compartment 34. In some cases, the concentrating stream flowing in the second liquid circuit may be discharged or transferred to drain 30 according to a predetermined schedule. Transfer to drain 30 may be accomplished by, for example, opening a drain valve (not shown) as necessary.

Figure 2C:
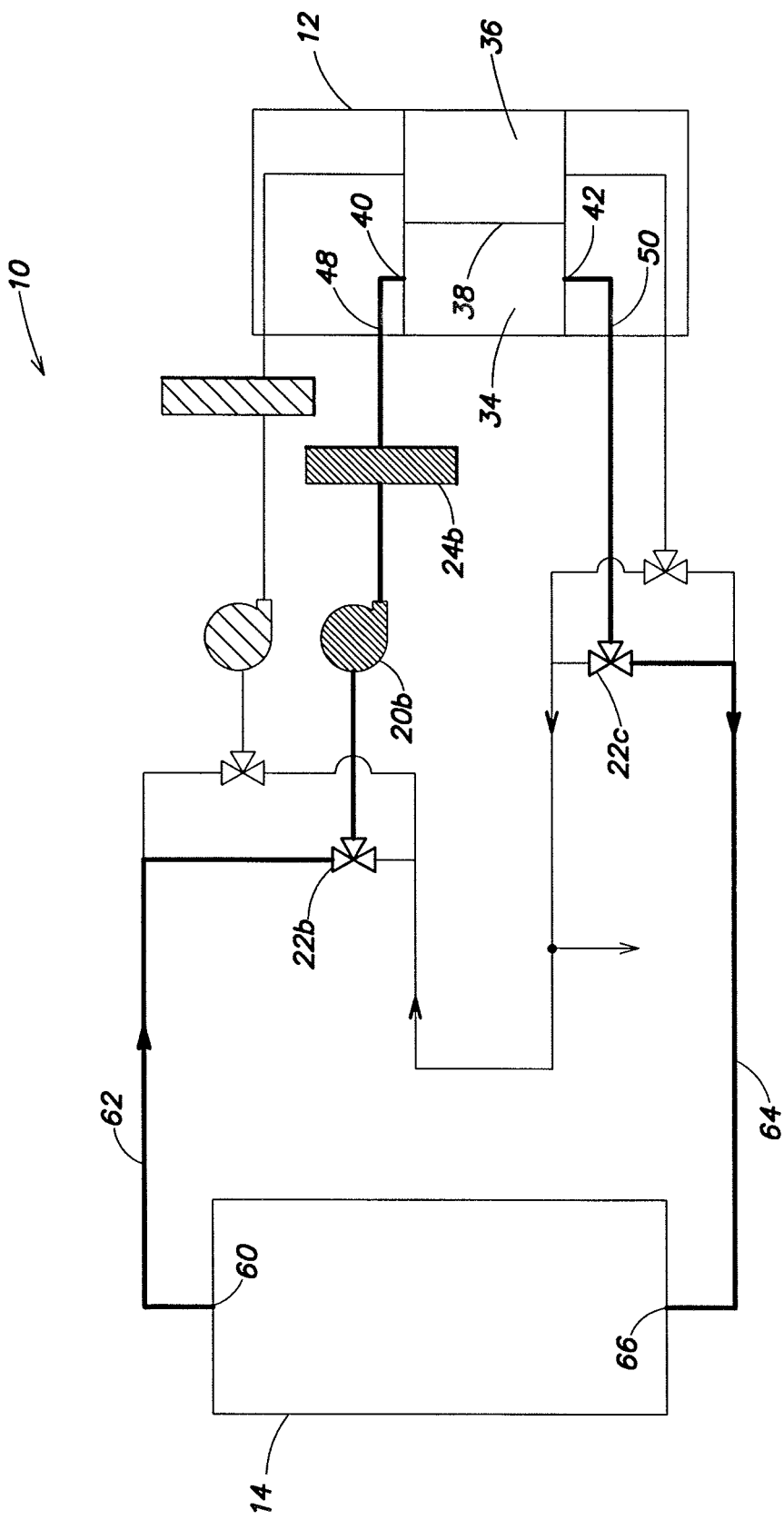
FIG. 2C is a schematic flow diagram of a treatment system illustrating a third fluid circuit flowing therein in accordance with one or more embodiments of the invention.
Figure 2D:
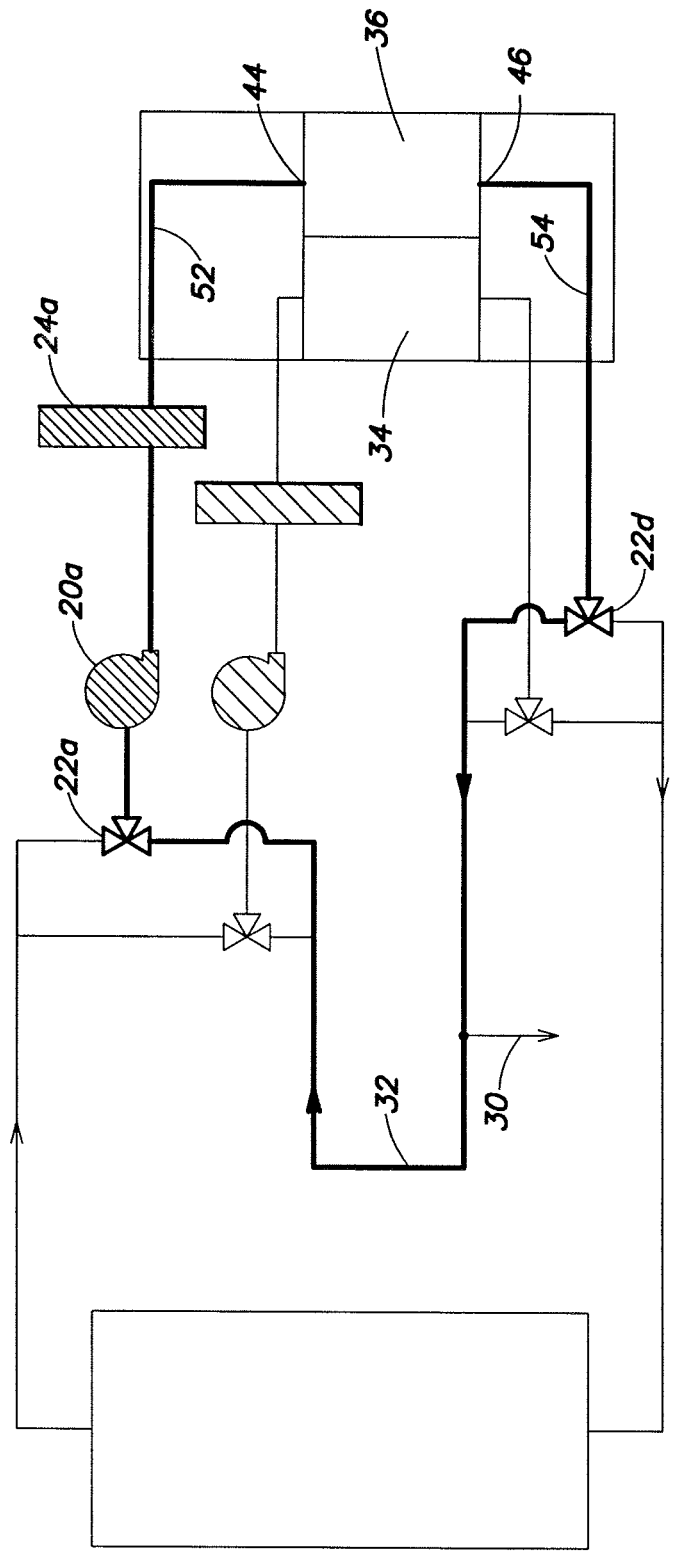
FIG. 2D is a schematic flow diagram of a treatment system illustrating a fourth liquid circuit flowing therein in accordance with one or more embodiments of the invention.

In another embodiment, illustrated in FIG. 2C, the present invention provides a third liquid circuit fluidly connecting reservoir system 14 to compartment 34 of electrodeionization device 12. The third liquid circuit can include connections to and from filter 24b. Typically, the third liquid circuit can comprise connections from outlet 60 of reservoir system 14 to conduit 62 to valve 22b to pump 20b to manifold 48 and to port 40 of compartment 34. The third fluid circuit can further comprise connections from port 42 to manifold 50 to valve 22c to conduit 64 and to inlet 66 of reservoir system 14. In the third liquid circuit, fluids to be treated from reservoir system 14 typically flows into compartment 34. Produced treated water can be transferred to reservoir system 14.

In another embodiment, the present invention can provide a fourth liquid circuit that provides a connection from an outlet of a concentrating compartment to an inlet of the same concentrating compartment of electrodeionization device 12. As illustrated in the schematic diagram of FIG. 2D, the fourth liquid circuit can connect outlet 46 of compartment 36 to manifold 54 to valve 22d which, in turn, can connect to circulating line 32. The fourth liquid circuit also can provide a connection from circulating line 32 to valve 22a to pump 20a and to port 44 of compartment 36 through manifold 52. This liquid circuit can include a connection to drain 30 so that a concentrating stream that typically flows in the fourth liquid circuit can be discharged.

Figure 3A:
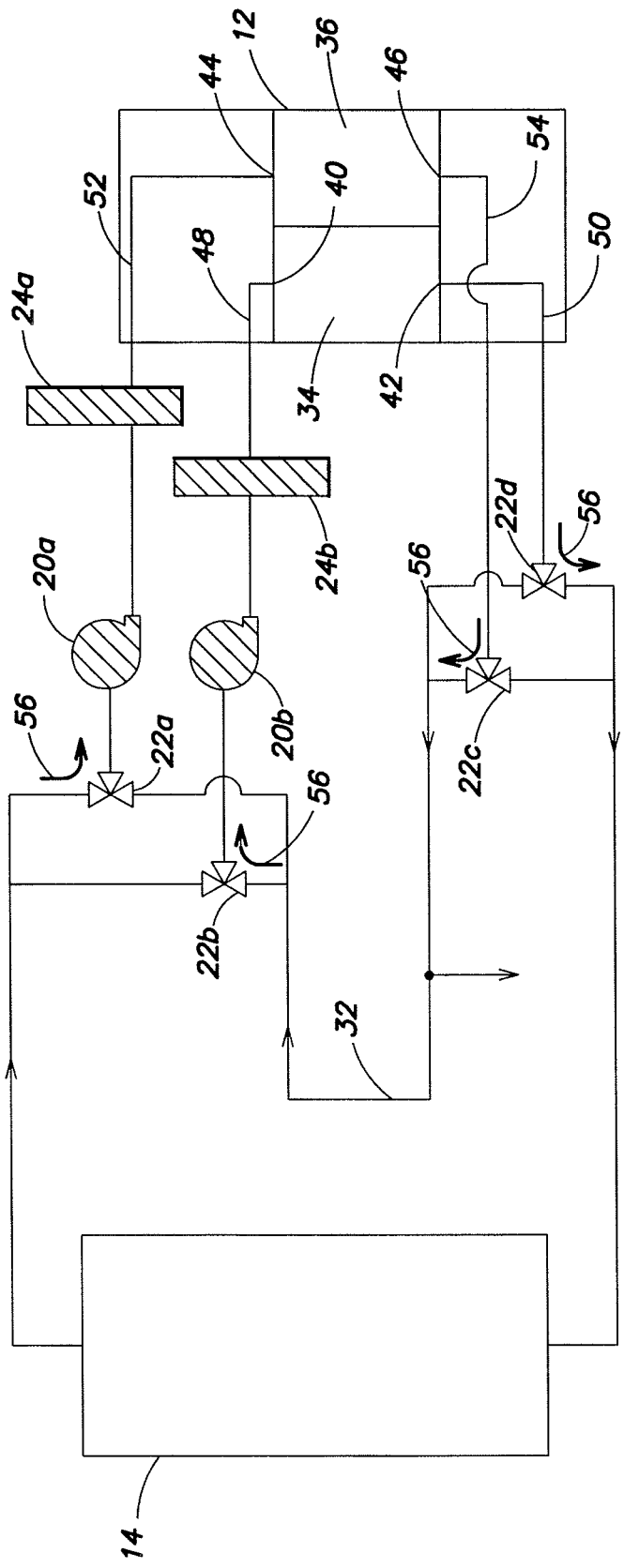
FIG. 3A is a schematic flow diagram of a treatment system illustrating the flow of flushing fluid flowing therein in accordance with one or more embodiments of the invention.

In another embodiment, as illustrated in FIG. 3A, the present invention provides for flushing of electrodeionization device 12 using treated water or at least partially treated water. Flushing of electrodeionization device 12 can be performed by transferring treated water using pumps 20a and 20b through valves 22a and 22b and, optionally, through filters 24a and 24b into compartments 34 and 36. This first flushing circuit can be performed sequentially so that compartment 36 is flushed with treated water before compartment 34 is flushed with the treated water that flows out of compartment 36. The fluid direction arrows 56 show that treated water, from reservoir 14, can be directed by valve 22a to flow through pump 20a to manifold 52 before entering port 44 of compartment 36. In this way, treated water may be used to replace or flush out any liquid accumulated in compartment 36. Continued operation of pump 20a, transferring treated liquid from reservoir 14, can force any liquid upstream of the treated flushing liquid to exit through port 46 and flow into manifold 54, which, eventually, can be redirected by valve 22c into recirculation line 32. Valve 22b can connect circulation line 32 pump 20b, which, in turn, can allow the treated to liquid to flow through manifold 48 and enter compartment 34 through port 40. Continued flow of the treated water, by the use of any of pumps 20a and 20b, or optionally, the coordinated use of both pumps, as well as properly oriented valves 22a, 22b, 22c and 22d can allow substantially all or most of the process lines, especially the wetted parts of treatment system 10, to be flushed with treated water from reservoir 14. In some cases, the treated water used to flush electrodeionization device 12 has a low LSI or is sufficiently pure to accommodate and meet the requirements of point of use 18 after being mixed with any liquid having undesirable ionic species. The present invention further provides a flushing system which replaces the liquid contents of electrodeionization device 10 with a liquid having a low LSI and, it is believed, provides inhibition of any scale formation. The liquid can be returned to reservoir system 14. As used herein, low LSI water has a LSI of less than about 2, preferably, less than about 1, and more preferably, less than about zero. In some embodiments, the present invention provides treated liquids, such as water, having a low conductivity. As used herein, a low conductivity liquid has a conductivity of less than about 300 μS/cm, preferably less than about 220 μS/cm and more preferably, less than about 200 μS/cm.

Figure 3B:
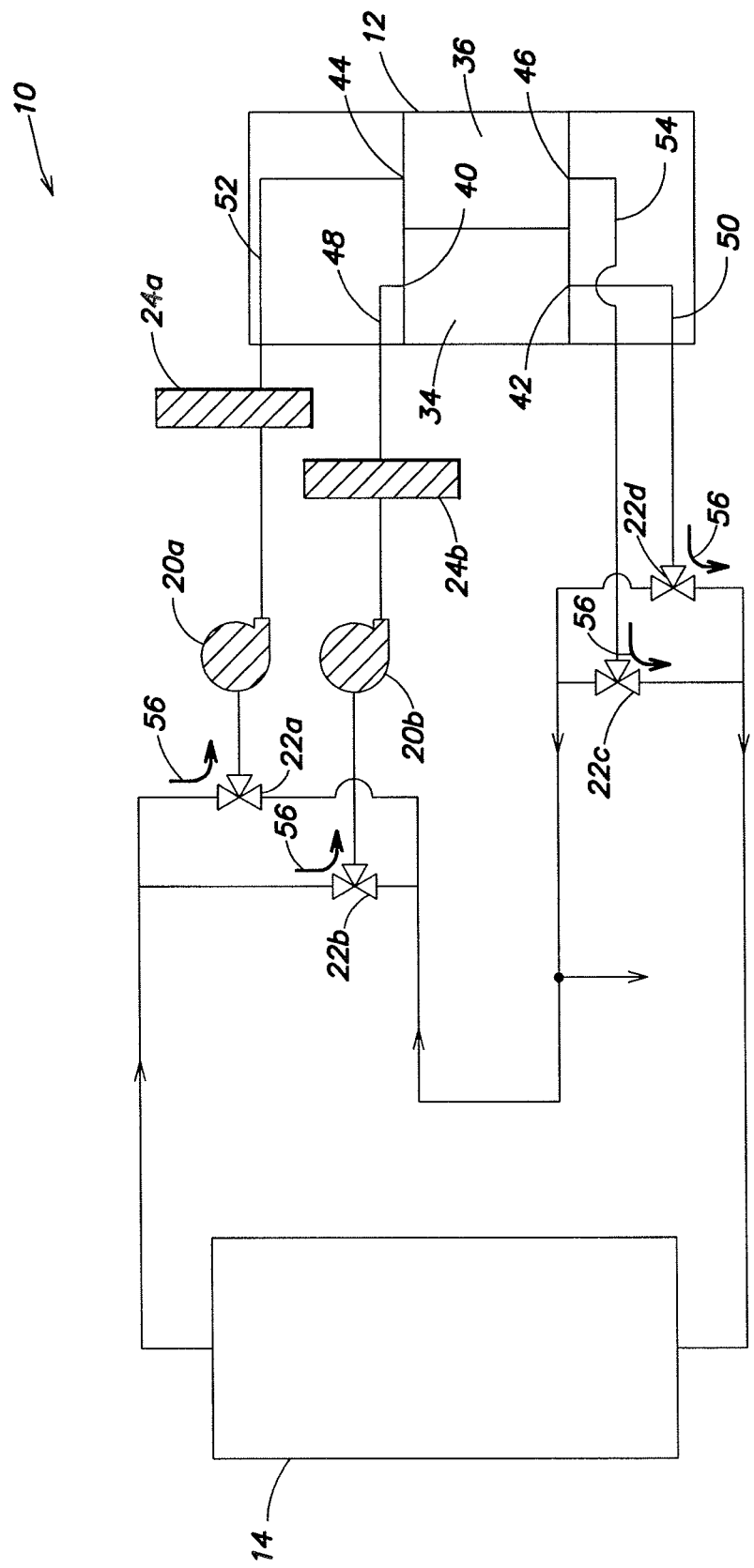
FIG. 3B is a schematic flow diagram of a treatment system illustrating the flow of flushing fluid flowing therein in accordance with one or more embodiments of the invention.

In another embodiment, the present invention can provide a second flushing circuit that can replace any liquid having a tendency to scale that may be present in treatment system 10. In the embodiment schematically illustrated in FIG. 3B, liquid, which may be treated water, from reservoir 14 flows in parallel through valves 22a and 22b through pump 20a and 20b into first and second compartments 34 and 36. Treated water can flow into manifolds 48 and 52 and enter the compartments through 40 and 44, respectively. Continued flow of the treated water can displace any liquid that may tend to form scale in compartments 34 and 36. Flushing can be continued by operating pumps 20a and 20b so that treated water can flow out through ports 42 and 46 and into manifold 50 and 54, respectively, and eventually be directed by valves 22c and 22d to return to reservoir 14. In this arrangement or technique, flushing fluid, such as treated water, can replace any liquid that may have accumulated in treatment system 10. As with the earlier described embodiments, the flushing arrangements or techniques can replace any liquid that may tend to form scale with a liquid that has a low LSI or a liquid that has little or no tendency to form scale. Similarly, the flushing liquid may be returned to reservoir system 14.

In some embodiments of the invention, reservoir system 14 comprises a pressurized vessel or a vessel that has inlets and outlets for fluid flow such as an inlet 58 and an outlet to 60. Inlet 58 is typically fluidly connected to point of entry 16 and outlet 60 is typically fluidly connected to a water distribution system or a point of use 18. Reservoir system 14 can have several vessels, each vessel, in turn, can have several inlets positioned at various locations. Similarly, outlet 60 can be positioned on each vessel at various locations depending on, among other things, demand or flow rate to point of use 18, capacity or efficiency of electrodeionization device 12 and capacity or hold-up of reservoir system 14. Reservoir system 14 can further comprise various components or elements that perform desirable functions or avoid undesirable consequences. For example, reservoir system 14 can have vessels having internal components, such as baffles that are positioned to disrupt any internal flow currents within the vessels of reservoir system 14. In accordance with some embodiments of the present invention, reservoir system 14 can comprise a heat exchanger for heating or cooling the fluid. For example, reservoir system 14 can comprise a vessel with a heating coil, which can have a heating fluid at an elevated temperature relative to the temperature of the fluid in the vessel. The heating fluid can be hot water in closed-loop flow with a heating unit operation such as a furnace so that the heating fluid temperature is raised in the furnace. The heating fluid, in turn, can raise the vessel fluid temperature by heat transfer. Other examples of internal or additional components include, but are not limited to, pressure relief valves designed to relieve internal pressure of any vessels and avoid or at least reduce the likelihood of vessel rupture. In yet another embodiment of the present invention, reservoir system 14 comprises a thermal expansion tank that is suitable for maintaining a desired operating pressure. The size and capacity of a thermal expansion tank will depend on factors including, but not limited to, the total volume of water, the operating temperature and pressure of the reservoir system.

In operation, reservoir system 14 is typically connected downstream of point of entry 16 and fluidly connected in-line, such as in a circulation loop, with an electrochemical device 12 such as an electrodeionization device. For example, water from point of entry 16 can flow into inlet 58 and can mix with the bulk water contained within reservoir system 14. Bulk water can exit reservoir system 14 through outlet 60 and can be directed to point of use 18 or through pumps 20a and 20b into electrochemical device 12 for purification or removal of any undesirable species. Treated water leaving electrochemical device 12 can mix with water from point of entry 16 and enter reservoir system 14 through inlet 60. In this way, a loop is formed between reservoir system 14 and electrodeionization device 12 and to feedwater from point of entry 16 can replenish water demand created by and flowing to point of use 18.

The electrochemical device can comprise any treatment apparatus or system that purifies or treats a fluid, such as water, by removing, at least partially, any undesirable species, such as hardness-causing species. Examples of such electrochemical devices include electrodionization devices, electrodialysis devices and capacitive deionization devices. Notably, the systems and techniques of the present invention can utilize other treatment apparatus or systems. For example, the present invention can utilize a reverse osmosis apparatus as a treatment device and the various arrangements and techniques described herein can be utilized to minimize or remove any hardness deposits present in such a system.

Point of entry 16 provides or connects water from a water source to the treatment system. The water source can be a potable water source, such as municipal water source or well water or it can be a non-potable water source, such as a brackish or salt-water source. In such instances, an intermediate purification or treatment system typically purifies the water for human consumption before it reaches point of entry 16. The water typically contains dissolved salts or ionic or ionizable species including sodium, chloride, chlorine, calcium ions, magnesium ions, carbonates, sulfates or other insoluble or semi-soluble species or dissolved gases, such as silica and carbon dioxide. Moreover, the water can contain additives such as fluoride, chlorate and bromate.

In another embodiment of the present invention, treatment system 10 includes a water distribution system, which in turn connects to a point of use. The water distribution system can comprise components that are fluidly connected to provide water, typically treated water, from reservoir system 14 to point of use 18. The water distribution system can comprise any arrangement of pipes, valves, tees, pumps and manifolds to provide water from reservoir system 14 to one or several points of use 18 or to any component of treatment system 10. In one embodiment, the water distribution system comprises a household or residential water distribution network including, but not limited to, connections to a sink faucet, a shower head, a washing machine and a dishwasher. For example, system 10 may be connected to the cold or hot, or both, water distribution system of a household.

In accordance with another embodiment of the present invention, treatment system 10 also comprises a sensor 28, typically a water property sensor, which measures at least to one physical property in treatment system 10. For example, sensor 28 can be a device that can measure turbidity, alkalinity, water conductivity, pH, temperature, pressure, composition or flow rate. Sensor 28 can be installed or positioned within treatment system 10 to measure a particularly preferred water property. For example, sensor 28 can be a water conductivity sensor installed in reservoir system 14 that measures the conductivity of the stored water, which can be an indication of the quality of the water available for service in point of use 18. In another embodiment of the invention, sensor 28 can comprise a series or a set of sensors. The set of sensors can be constructed, arranged or connected to controller 26 so that controller 26 can monitor, intermittently or continuously, the quality of water. In such an arrangement, the performance of treatment system 10 can be optimized as described below. Other embodiments of the invention may comprise a combination of sets of sensors in various locations throughout treatment system 10. For example, sensor 28 can be a flow sensor measuring a flow rate to a point of use 18 and further include any of a nephelometer, pH, composition, temperature and pressure sensor monitoring the operating condition of treatment system 10.

In accordance with another embodiment of the present invention, treatment system 10 can further comprise a pretreatment system 24 designed to remove a portion of any undesirable species from the water before the water is introduced to, for example, reservoir system 14 or the treatment device, e.g., the electrochemical device. Examples of pretreatment systems include, but are not limited to, reverse osmosis devices, which are typically used to desalinate brackish or salt water. Notably, a carbon or charcoal filter may be necessary to remove at least a portion of any chlorine or any species that may foul or interfere with the operation of electrochemical device.

Pretreatment system 24 can be positioned anywhere within treatment system 10. For example, pretreatment system 24 can be positioned upstream of reservoir system 14 or downstream of reservoir system 14 but upstream of electrodeionization device 12 so that at least some chlorine species are retained in reservoir system 14 but are removed before liquid enters electrodeionization device 12. Pretreatment system 24 can comprise a filter or an arrangement of filters. As shown in FIG. 1, pretreatment system 24 comprises filters 24a and 24b upstream of compartments 34 and 36. In other cases, pretreatment system 24 can comprise a filter upstream of reservoir system 14 as well as filters 24a and 24b between pumps 20a and 20b and compartments 36 and 34. Filters 24a and 24b can be any of a to particulate, carbon, iron filter or combinations thereof.

In accordance with other embodiments of the present invention, the treatment system can further comprise pre or post treatment apparatus or systems disposed in any part thereof to allow decontamination or inactivation of any microorganisms such as bacteria that may accumulate in any component of the treatment system. For example, a pretreatment apparatus may be fluidly connected to a distribution system of the present invention. In other embodiments of the invention, a post treatment device can treat fluid prior to being delivered to a point of use. Examples of such apparatus or systems that can destroy or inactivate microorganisms include those that provide actinic radiation, or ultraviolet radiation, and/or ozone. Other examples of such devices include those that remove bacteria by ultrafiltration or microfiltration. In accordance with other embodiments of the present invention, the treatment system can further include one or more chemical delivery systems that disinfects one or more components of the treatment system. For example, a chemical treatment system can be fluidly connected to any component of the treatment system to deliver a chemical that destroys or renders any bacteria inactive. Examples of such chemicals include, but are not limited to, acids, bases or other disinfecting compounds such as alcohols. In further embodiments of the present invention, a hot water disinfecting apparatus can be fluidly connected to the treatment system of the present invention. The hot water disinfecting system can provide hot water that destroys or inactivates any bacteria that may accumulate in any component of the treatment system.

In yet another embodiment of the present invention, treatment system 10 further comprises a controller 26 that is capable of monitoring and regulating the operating conditions of treatment system 10 including its components. Controller 26 is typically a microprocessor-based device, such as a programmable logic controller (PLC) or a distributed control system, that receives or sends input and output signals to and from components of treatment system 10. In one embodiment of the invention, controller 26 can be a PLC that sends a signal to power source (not shown), which supplies power to electrodeionization device 12 or a signal to a motor control center that energizes the motors of pumps 20a and 20b. In certain embodiments of the invention, controller 26 regulates the operating conditions of treatment system 10 in open-loop or closed-loop control scheme. For example, controller 26, in open-loop control, can provide signals to the treatment system such that water is treated without measuring any operating condition. In contrast, controller 26 can control the operating conditions in closed-loop control so that operating to parameters can be adjusted depending on an operating condition measured by, for example, sensor 28. In yet another embodiment of the invention, controller 26 can further comprise a communication system such as a remote communication device for transmitting or sending the measured operating condition or operating parameter to a remote station.

In accordance with another embodiment of the present invention, controller 26 can provide a signal that actuates valves 22a, 22b, 22c, and 22d so that liquid flow is directed based on a variety of parameters including, but not limited to, the quality of water from point of entry 16, the quality of water to point of use 18, the demand or quantity of water to point of use 18, the operating efficiency or capacity of electrodeionization device 12, or any of a variety of operating conditions, such as turbidity, alkalinity, water conductivity, pH, composition, temperature, pressure and flow rate. In one embodiment of the invention, controller 26 can receive signals from sensor 28 so that controller 26 can be capable of monitoring the operating parameters of treatment system 10. For example, sensor 28 can be a water conductivity sensor positioned within reservoir system 14 so that the water conductivity in reservoir system 14 can be monitored by controller 26. Controller 26 can, based on the water quality measured by sensor 28, control a power source, which can provide an electric field to electrodeionization device 12. So, in operation, controller 26 can increase or decrease or otherwise adjust the voltage and current supplied from power source 24 to, for example, electrodeionization device 16. In yet another embodiment, the present invention provides for adjusting an operating parameter, for example, the rate of discharge to drain 30 or the period during discharge, as a function of at least one measured parameter such as the system operating pressure. For example, the period during which a valve (not shown), in FIG. 1, is actuated open to drain 30 can be adjusted based on the measured pressure of the liquid supplied to point of use 18. In some cases, the valve may be actuated open to reduce the measured pressure or it may be minimally actuated, depending on the type of valve, when the measured pressure is below a predetermined value. Such a secondary control scheme can be incorporated or nested within any of the existing control loops actuating the valve described above.

In accordance with another embodiment of the present invention, the valve can serve as part of a pressure control loop as well as a part of a concentrate discharge control loop. For example, the valve can be actuated by controller 26 when the measured conductivity of the concentrate stream reaches a set point. A separate pressure control loop incorporating the valve can be superimposed or nested within an existing control loop to relieve pressure to in system 10. In any of the above-mentioned control schemes, the control loops can incorporate feedback as well as any of proportional, derivative, integral or, preferably, a combination thereof. In another embodiment of the invention, a control loop that directs the discharge of a concentrate stream to drain 30 can have a nested control loop parameter that depends on or factors in the pressure of liquid delivered to point of use 18 to provide a control signal.

In another embodiment of the present invention, controller 26 can reverse the direction of the applied current from power source to electrodeionization device 12 according to a predetermined schedule or according to an operating condition, such as the water quality or any other operating parameter. Polarity reversal has been described by, for example, Giuffrida et al., in U.S. Pat. No. 4,956,071, which is incorporated herein by reference in its entirety.

Controller 26 can be configured or configurable by programming or can be self-adjusting such that it is capable of maximizing any of the service life and the efficiency of or reducing the operating cost of treatment system 10. For example, controller 26 can comprise a microprocessor having user-selectable set points or self-adjusting set points that adjusts the applied voltage and current to an electrochemical device such as an electrodeionization device, the flow rate through the concentrating and depleting compartments of the electrodeionization device or the discharge flow rate to drain 30 from the electrodeionization device or the pretreatment system or both. Other modifications and equivalents of the controller, as part of the treatment system disclosed, will occur to persons skilled in the art using no more than routine experimentation. For example, the incorporation of adaptive, self-adjusting, or self-diagnosing techniques capable of alerting changing the operating parameters based on a variety of input conditions such as rate of water use or time of water use, are believed to be within the scope and spirit of the invention. Controller 26 can incorporate dead band control to reduce the likelihood of unstable on/off control or chattering. Dead band refers to the range of signal outputs that a sensor provides without necessarily triggering a responsive control signal. The dead band may reside, in some embodiments of the invention, intrinsically in the sensor or may be programmed as part of the control system, or both. Dead band control can avoid unnecessary intermittent operation by smoothing out measurement excursions. Such control techniques can prolong the operating life or mean time before failure of the components of treatment system 10. Other techniques that can be used include the use of voting, time-smoothing or time-averaging measurements or combinations thereof.

In another embodiment of the present invention, water, typically from waste stream, to auxiliary use can serve or provide additional or secondary benefits. For example, waste stream, rather than going to drain 30, may be used to provide irrigating water to any residential, commercial or industrial use, such as for irrigating, for recycling or for recovery of collected or concentrated salts.

The treatment system can comprise a fluid circuit that can provide treated or, in some cases, softened water to an electrode compartment of the electrochemical device. The fluid circuit can comprise fluid connections from a treated water source to the electrode compartments of the electrochemical device. The fluid circuit can also comprise a pretreatment unit, such as a carbon filter that can remove any species, such as chlorine, which can interfere with the operation of the electrochemical device. The fluid circuit can also include fluid connections to at least one of the depleting and the concentrating compartments of, for example, the electrodeionization device, for example, downstream of the pretreatment unit. The fluid circuit connections, in one embodiment of the invention, provides connections so that fluid exiting the electrode compartments can be, for example, mixed together or mixed with fluid to be treated in the depleting compartment. The fluid circuit can also comprise pumps and valves that can direct fluid flow to and from the electrochemical device as well as to and from the reservoir system. In some cases, the fluid circuit is arranged to provide fluid connections that creates parallel flow paths through the electrode compartments of the electrodeionization device. Other arrangements and configurations are considered to be within the scope of the present invention including, for example, serial flow paths from one electrode compartment to the other, the use of single, multiple or dedicated pretreatment units as well as multiple or staged treatment units including, but not limited to, reverse osmosis, ion exchange and electrodeionization devices, or combinations thereof, in the fluid circuit.

The treatment system can comprise a fluid circuit that provides fluid connections from a depleting compartment to at least one electrode compartment of the electrodeionization device. Such an arrangement can provide treated water, preferably water having low LSI, to the electrode compartment. The fluid circuit can be arranged so that the fluid flow paths can be in series or in parallel through the electrode compartments. The fluid circuit can further comprise fluid connections to allow the fluid that would exit the electrode compartment to be delivered to a point of use via, for example, a water distribution system. In some arrangements according to the present invention, the fluid circuit can comprise fluid connections so that untreated fluid can be mixed with fluid that would exit any of electrode compartments; the mixture can be delivered to the point of use. In another embodiment of the invention, the fluid circuit can further comprise fluid connections to and from a reservoir system so that, for example, treated fluid that would exit the depleting compartment can be transferred to the reservoir system and mixed with untreated fluid from the point of entry and the mixture can be delivered to the point of use and, optionally, to the electrode compartments of the electrodeionization device in parallel or series flow paths. Other arrangements and combinations including, for example, the mixing of treated and untreated water to produce a mixed electrode compartment flushing fluid is considered to be within the scope of the present invention.

The present invention will be further illustrated through the following example, which is illustrative in nature and is not intended to limit the scope of the invention.

EXAMPLE

Figure 4:
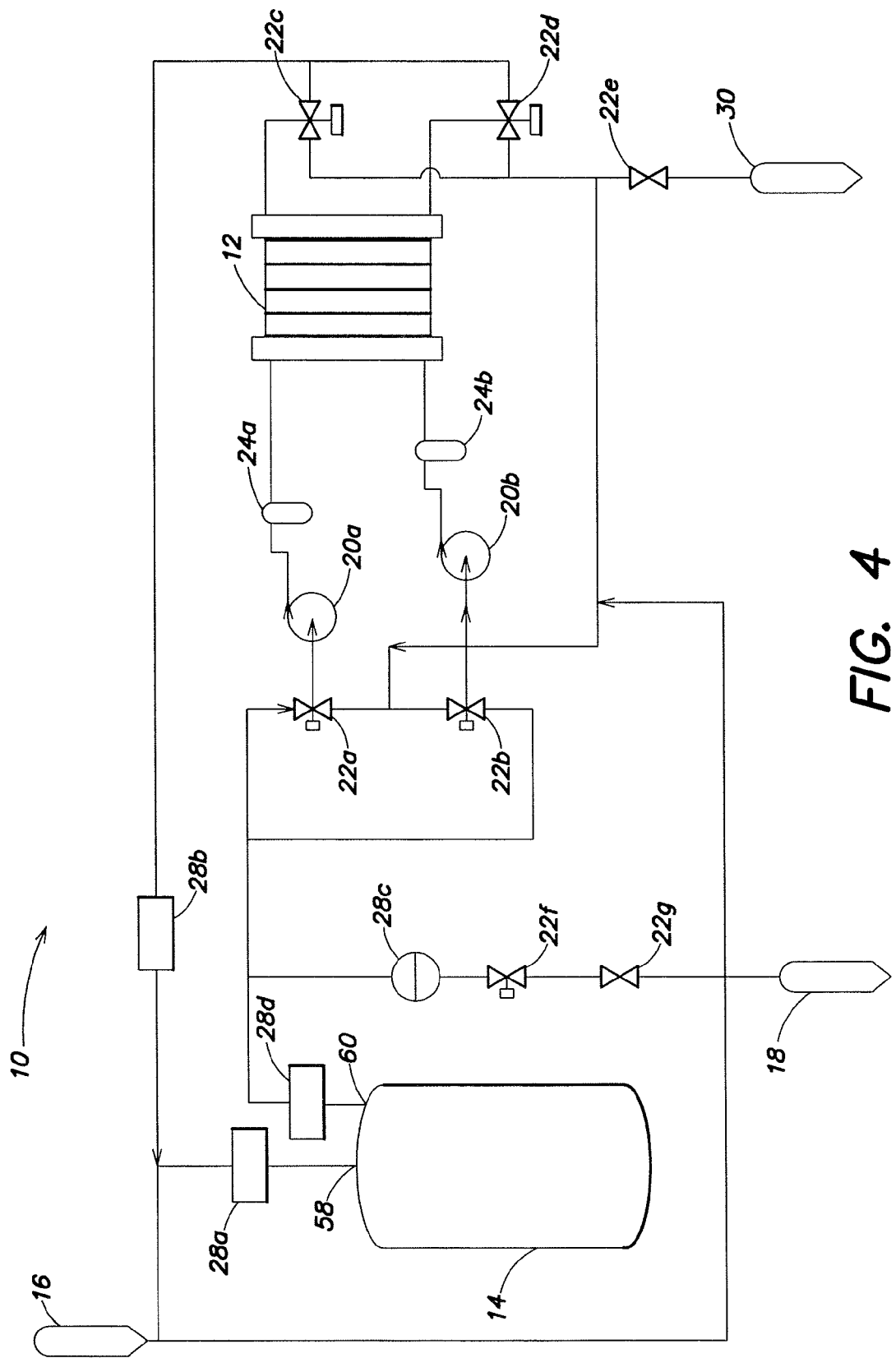
FIG. 4 is a schematic flow diagram of a treatment system according to another embodiment of the present invention as described in the Example.

An in-line pressurized treatment system, schematically shown in FIG. 4 was assembled and evaluated. The treatment system 10 comprised an electrodeionization module 12 and a pressurized storage vessel 14. Water, from point of entry 16, was introduced into pressurized storage vessel 14 through inlet 58 and was circulated using pumps 20a and 20b and passed through pretreatment units 24a and 24b and electrodeionization device 12. The treatment system was controlled by a programmable controller (not shown) based on the measured water conductivity, as measured by any of sensors 28a, 28b, 28c, and 28d.

Electrodeionization device 12 comprised of a 10-cell pair stack with flowpaths that were about 7.5 inches long and about 2.5 inches wide. Each cell was filled with about 40% AMBERLITE® SF 120 resin and about 60% AMBERLITE® IRA 458 resin, both available from Rohm & Haas Company, Philadelphia, Pa. The electrodeionization device had an expanded titanium electrode coated with ruthenium oxide.

The controller was a MICROLOGIX™ 1000 programmable controller available from Allen-Bradley Company, Inc., Milwaukee, Wis. The electrodeionization device was set to start up either by a flow switch signal or when the water conductivity of the outlet stream leaving the pressurized vessel was higher than a set point. The electrodeionization to device operated until the conductivity reached the set point. The feed from the electrodeionization device was circulated from the pressurized vessel via a second feed pump. The polarity of the electric field applied to the electrodeionization device was reversed about every 15 minutes. In addition to controlling the components of electrodeionization device 12, the PLC collected, stored and transmitted measured data from sensors 28a, 28b, 28c, and 28d.

Pressurized vessel 14 was a 10-inch diameter fiberglass vessel with about a 30-gallon capacity. Pressurized vessel 14 was fitted with a valve head and a center manifold pipe. The concentrate stream leaving the electrodeionization device was partially circulated and partially rejected to a drain 30 by actuating valves 22c, 22d, and 22e. Make-up water, from point of entry 16, was fed into the circulating stream to compensate for any water that was rejected to drain 30.

The pretreatment units 24a and 24b each comprised of an aeration iron-filter with a 25-micron rating, a 20 inch×4 inch sediment filter and a 20 inch×4 inch carbon block filter.

In one flow direction, water from pressure vessel 14 was pumped by pump 20a, through valve 22a, to pretreatment unit 24a before being introduced to the depleting compartments of electrodeionization device 12. Treated water from electrodeionization device 12 was directed by valve 22a to storage in pressure vessel 14. Fluid collecting removed ionic species was circulated by pump 20b through pretreatment unit 24b, and the concentrating and electrode compartments of electrodeionization device 12 by activating valves 22d and 22b. When the polarity of the applied electric field was reversed, the flow directions were correspondingly adjusted so that pump 20a, pretreatment unit 24a, and valve 22a circulated the liquid accumulating ionic species. Similarly, water to be treated was pumped from pressure vessel 14 using pump 20b through valve 22d to pretreatment unit 24b before being introduced and treated in the depleting compartments of electrodeionization device 12. Treated water was directed by valve 22d to pressure vessel 14.

The flow rate of treated water, as measured by flow indicator 28c, to a point of use 18 from outlet 60 of pressurized vessel 14 was regulated by adjusting valves 22f and 22g. To discharge concentrate or waste stream, valve 22e was operated as necessary. Water from point of entry 16 was used to restore and replace fluid that was discharged to drain 30 or consumed in point of use 18.

The treatment system was operated until a target set point of about 220 μS/cm was reached and stable for about one minute. The applied voltage to the electrodeionization device was about 46 volts. The flow rates into the depleting and concentrating compartments were maintained at about 4.4 liters per minute. The reject flow rate was controlled to discharge about 270 ml about every 30 seconds. The pressure in the vessel was about 15 psig to about 20 psig.

Figure 5:
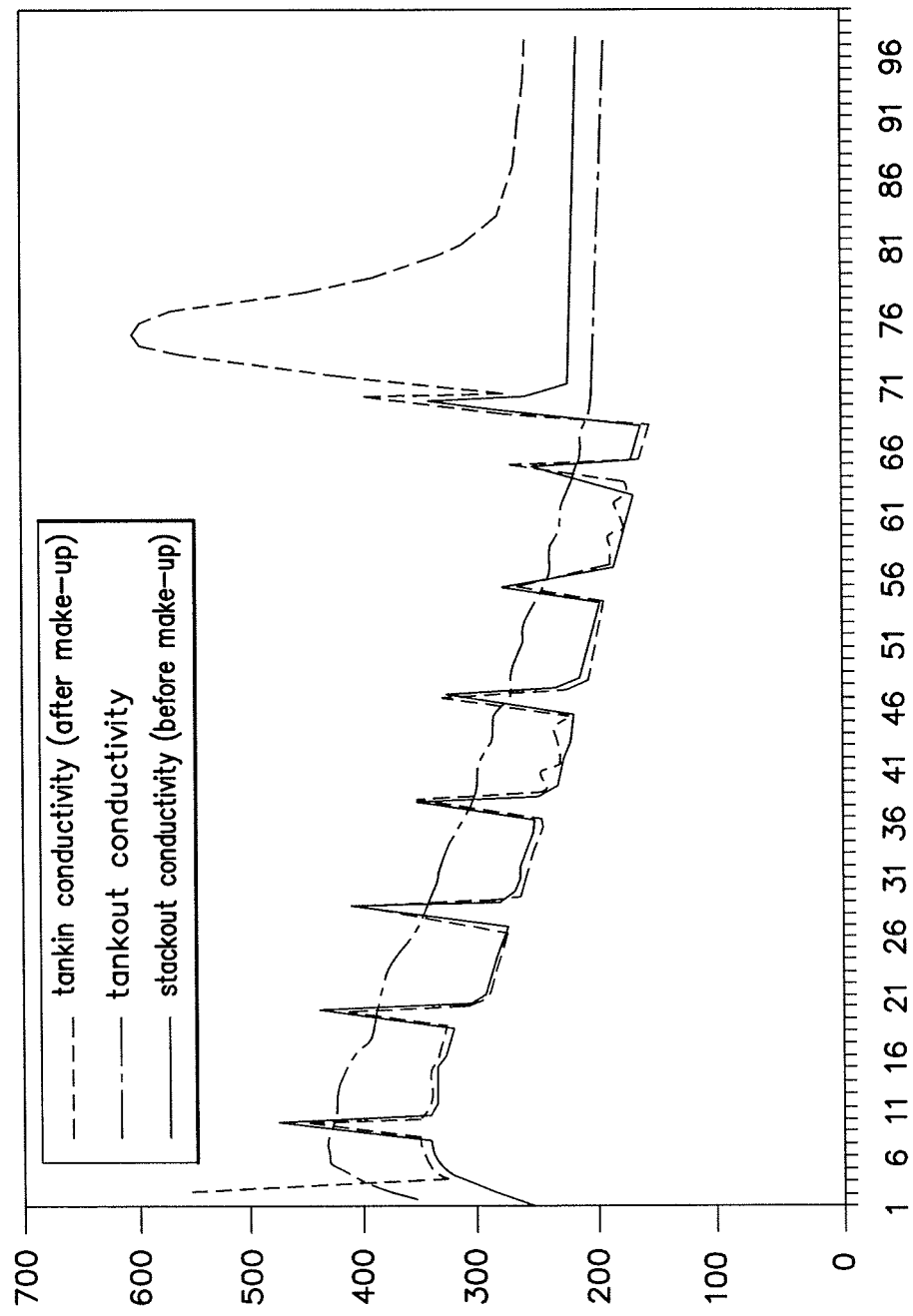
FIG. 5 is a graph showing the measured conductivity of the treatment system shown schematically in FIG. 4.

FIG. 5 shows the measured conductivity, of the various streams in the treatment system as a function of run time. Tables 1 and 2 summarize the measured properties of the various streams of the treatment system at the start and end of the test, respectively. The data presented in Table 1 showed that the initial feed stream, labeled as tankout conductivity in FIG. 5, into electrodeionization device 12, with a conductivity of about 412 μS/cm, was treated to produce an initial dilute stream, labeled as stackout conductivity in FIG. 5, having a conductivity of about 312 μS/cm, without a substantial pH change. Similarly, at the end of the test run, water, having a conductivity of about 221 μS/cm, was treated to produce lower conductivity water, of about 164 μS/cm, without a substantial pH change. It is believed that the lower conductivity of the feed stream at the end of the test run reflected the effect of circulation, which effectively removed undesirable species over several passes. Thus, the data shows that the system schematically illustrated in FIG. 4 can treat or soften water that is suitable for household or residential use.

TABLE 1

Stream properties at the start of the test run.

|  | Feed Stream | Reject Stream | Product Stream |
|---|---|---|---|
| pH | 8.19 | 8.3 | 8.02 |
| Conductivity (μS/cm) | 412 | 944.9 | 312.0 |

TABLE 2

Stream properties at the end of the test run.

|  | Feed Stream | Reject Stream | Product Stream |
|---|---|---|---|
| pH | 8.37 | 8.33 | 7.75 |
| Conductivity (μS/cm) | 221 | 833.8 | 164 |

The present invention has been described using water as the liquid but should not be limited as such. For example, where reference is made to treated water, it is believed that other fluids can be treated in the system or according to the method of the present invention. Moreover, where reference is made to a component of the system, or to a step of the method, of the present invention that adjusts, modifies, measures or operates on water or water property, the present invention is believed to be applicable as well. Thus, the fluid to be treated may be a fluid that is a mixture comprising water. Accordingly, the fluid can be a to liquid that comprises water.

Those skilled in the art would readily appreciate that all parameters and configurations described herein are meant to be exemplary and that actual parameters and configurations will depend on the specification application for which the systems and methods of the present invention are used. Those skilled in the art should recognize or be able to ascertain using no more than routine experimentation many equivalents to the specific embodiments of the invention described herein. For example, the present invention includes the use of other unit operations such as, but not limited to, reverse osmosis and ultraviolet device. It is, therefore, to be understood that the further embodiments are presented by way of example only and that, within the scope of the appended claims and equivalents thereto, the invention may be practiced otherwise as specifically described. The invention is directed to each individual feature, system, or method described herein. In addition, any combination of two or more such features, systems, or methods provided at such features, systems, or methods that are not mutually inconsistent, is included within the scope of the present invention.

What is claimed is:

1. A method of treating a liquid, comprising:
establishing a first liquid circuit having liquid to be treated flowing therein from a reservoir to a first compartment inlet of an electrochemical device;
establishing a second liquid circuit having a concentrating liquid flowing therein from a second compartment outlet of the electrochemical device to a second compartment inlet;
establishing a third liquid circuit having liquid to be treated flowing therein from the reservoir to the second compartment inlet; and
flushing at least one of the first liquid circuit and the third liquid circuit periodically with treated water having an LSI of less than about 2 from the reservoir in response to a rate of demand or a time of demand to inhibit scale formation.

2. The method of claim 1, further comprising establishing a fourth liquid circuit having the concentrating liquid flowing therein from the first compartment outlet to the first compartment inlet.

3. The method of claim 1, further comprising applying an electric field across the electrochemical device.

4. The method of claim 3, further comprising reversing a polarity of the applied electric field after establishing the third liquid circuit.

5. The method of claim 1, wherein establishing the third liquid circuit comprises actuating a first valve to direct the liquid to be treated to flow through a first pump.

6. The method of claim 5, further comprising actuating a second valve to direct the concentrating liquid to flow through a second pump.

7. The method of claim 1, further comprising measuring at least one of a pressure, temperature, flow rate, pH, conductivity and composition of the liquid.

8. The method of claim 1, wherein the first liquid circuit and the third liquid circuit are flushed simultaneously, and wherein the first and second compartments are flushed in parallel with the treated liquid.

9. The method of claim 1, further comprising flushing the second liquid circuit by actuating a first valve to direct treated water from the first liquid circuit to the second liquid circuit, and actuating a second valve to direct treated water from the second liquid circuit to the first liquid circuit, wherein the first and second compartments are flushed sequentially with the treated water.

10. The method of claim 1, further comprising establishing a fourth liquid circuit having liquid from the reservoir flowing therein from the reservoir to the first and second compartments.

11. The method of claim 10, wherein the liquid from the reservoir has a negative LSI.

12. The method of claim 1, further comprising delivering at least a portion of the treated liquid to a point of use.

13. The method of claim 12, further comprising post treating the treated liquid prior to delivering the treated liquid to the point of use.

14. The method of claim 1, further comprising disinfecting at least a portion of any component of any of the first liquid circuit, the second liquid circuit and the third liquid circuit.

15. A method of treating water from a reservoir, comprising:
passing at least a portion of water to be treated through a depleting compartment of an electrochemical device to produce treated water having an LSI of less than about 2;
circulating a concentrating stream through a concentrating compartment of the electrochemical device;
circulating at least a portion of the concentrating stream through the depleting compartment; and
flushing at least one of the depleting compartment and the concentrating compartment periodically with the treated water in response to a rate of demand or a time of demand to inhibit scale formation.

16. The method of claim 15, further comprising passing at least a portion of the water to be treated through a pump.

17. The method of claim 15, further comprising flushing the depleting compartment while flushing the concentrating compartment.

18. The method of claim 15, further comprising flushing the depleting and concentrating compartments with treated water sequentially.

19. The method of claim 15, further comprising passing the water from the reservoir through the depleting compartment after passing the water through the concentrating compartment.

20. The method of claim 15, further comprising:
applying an electric field through the electrochemical device; and
reversing a polarity of the applied electric field.

* * * * *